United States Patent
Ito et al.

(10) Patent No.: US 10,711,162 B2
(45) Date of Patent: Jul. 14, 2020

(54) ADHESIVE AGENT

(71) Applicant: DAICEL CORPORATION, Osaka-shi, Osaka (JP)

(72) Inventors: Yousuke Ito, Himeji (JP); Hiroki Tanaka, Himeji (JP); Kiyoharu Tsutsumi, Himeji (JP)

(73) Assignee: DAICEL CORPORATION, Osaka-Shi (JP)

( * ) Notice: Subject to any disclaimer, the term of this patent is extended or adjusted under 35 U.S.C. 154(b) by 602 days.

(21) Appl. No.: 15/028,147

(22) PCT Filed: Oct. 6, 2014

(86) PCT No.: PCT/JP2014/076707
§ 371 (c)(1),
(2) Date: Apr. 8, 2016

(87) PCT Pub. No.: WO2015/053223
PCT Pub. Date: Apr. 16, 2015

(65) Prior Publication Data
US 2016/0264822 A1 Sep. 15, 2016

(30) Foreign Application Priority Data
Oct. 11, 2013 (JP) .................................. 2013-214164

(51) Int. Cl.
| | | |
|---|---|---|
| *C09J 5/06* | (2006.01) |
| *C09J 4/00* | (2006.01) |
| *C09J 5/00* | (2006.01) |
| *C09J 201/02* | (2006.01) |
| *C09J 11/06* | (2006.01) |
| *C09J 125/08* | (2006.01) |
| *C09J 125/18* | (2006.01) |
| *C09J 133/06* | (2006.01) |

(52) U.S. Cl.
CPC . *C09J 5/06* (2013.01); *C09J 4/00* (2013.01); *C09J 5/00* (2013.01); *C09J 11/06* (2013.01); *C09J 125/08* (2013.01); *C09J 125/18* (2013.01); *C09J 133/066* (2013.01); *C09J 201/02* (2013.01); *C09J 2203/326* (2013.01)

(58) Field of Classification Search
CPC ........ C09J 5/06; C09J 133/066; C09J 125/18; C09J 125/08; C09J 201/02; C09J 4/00; C09J 11/06; C09J 5/00
USPC ....................................................... 156/272
See application file for complete search history.

(56) References Cited

U.S. PATENT DOCUMENTS

| | | | |
|---|---|---|---|
| 4,617,354 A * | 10/1986 | Augustin ................. | C08K 5/06 525/301 |
| 4,744,852 A | 5/1988 | Augustin et al. | |
| 6,827,880 B2 * | 12/2004 | Ishimatsu ................. | C09J 4/00 252/511 |
| 2013/0211028 A1 * | 8/2013 | Shinike ................... | G06F 3/044 526/307.5 |

FOREIGN PATENT DOCUMENTS

| | | |
|---|---|---|
| EP | 0 158 540 A1 | 10/1985 |
| JP | 60-179479 A | 9/1985 |
| JP | 2000-104039 A | 4/2000 |
| JP | 2001-226643 A | 8/2001 |
| JP | 2004-285242 A | 10/2004 |
| JP | 2007-186630 A | 7/2007 |
| JP | 2008-49443 A | 3/2008 |
| JP | 2011-12098 A | 1/2011 |
| JP | 2011012098 * | 1/2011 |
| JP | 5074715 B2 | 11/2012 |
| JP | 5074716 B2 | 11/2012 |
| WO | WO 2012/133142 A1 | 10/2012 |

OTHER PUBLICATIONS

International Search Report for PCT/JP2014/076707 dated Dec. 16, 2014.
Written Opinion of the International Searching Authority for PCT/JP2014/076707 (PCT/ISA/237) dated Dec. 16, 2014.

* cited by examiner

*Primary Examiner* — Michael N Orlando
*Assistant Examiner* — Christian Roldan
(74) *Attorney, Agent, or Firm* — Birch, Stewart, Kolasch & Birch, LLP

(57) ABSTRACT

Provided are: an adhesive that offers high adhesiveness to bond and secure an adherend even in a high-temperature environment, as long as securing is necessary. The adherend can be removed without failure and without adhesive residue once securing becomes unnecessary; and a method for processing an adherend using the adhesive. The adhesive according to the present invention contains a multivalent vinyl ether compound (A) and at least one of a compound (B) and a compound (C). The compound (B) is represented by Formula (b). The compound (C) includes two or more constitutional units each represented by Formula (c). Formulae (b) and (c) are expressed as follows:

[Chem. 1]

$$Z_1-(X)_{n_1} \quad (b)$$

[Chem. 2]

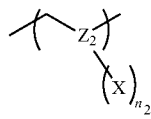

(c)

6 Claims, No Drawings

ADHESIVE AGENT

TECHNICAL FIELD

The present invention relates to an adhesive (adhesive agent) that can bond and secure an adherend even in a high-temperature environment and, once the securing becomes unnecessary, is easily removable. This application claims priority to Japanese Patent Application No. 2013-214164 filed Oct. 11, 2013 to Japan, the entire contents of which are incorporated herein by reference.

BACKGROUND ART

Semiconductor chips are more and more reduced in size and thickness and are more and more three-dimensionally integrated so as to achieve reduced size and weight, higher functions, minimized power consumption, and any other advantages. The semiconductor chips as above are produced by patterning circuits on a wafer, backgrinding the patterned wafer to thin the wafer, and dicing the thinned wafer. The wafer after thinning is very fragile and is susceptible to failure (breakage) upon processing such as grinding and dicing and upon transportation. To eliminate or minimize this, the wafer is processed and transported while being temporarily secured typically to a supporting substrate and being protected.

A waxy adhesive has been used for the wafer temporary securing (Patent Literature (PTL) 1). The waxy adhesive, however, has a low softening point or melting point and flows to fail to secure the wafer upon a high-temperature process performed typically when film deposition in patterning is performed via vapor deposition and when the wafer is transferred from the temporary-securing substrate to a wafer for integration. Another known adhesive is a heat-sensitive adhesive including a pressure-sensitive adhesive and a side-chain crystalline polymer (PTL 2 and PTL 3). Disadvantageously, however, this adhesive also flows and fails to secure the wafer in a high-temperature process. Yet another known adhesive is an adhesive that is cured, shrunk, and deformed by the irradiation typically with an ultraviolet ray, and the adherend is thereby removed. Unfortunately, however, this adhesive applies stress to the wafer upon removal and causes warping and/or fracture of the wafer.

CITATION LIST

Patent Literature

PTL 1: Japanese Unexamined Patent Application Publication (JP-A) No. 2008-49443
PTL 2: Japanese Patent No. 5074715
PTL 3: Japanese Patent No. 5074716

SUMMARY OF INVENTION

Technical Problem

Accordingly, the present invention has an object to provide an adhesive that offers high adhesiveness to bond and secure an adherend even in a high-temperature environment, and, once the securing becomes unnecessary, allows the adherend to be removed without failure of the adherend.

The present invention has another object to provide a method for temporarily securing an adherend using the adhesive.

The present invention has yet another object to provide a method for processing an adherend using the adhesive.

The present invention has still another object to provide an adhesive film derived from the adhesive.

Solution to Problem

After intensive investigations to achieve the objects, the inventors of the present invention made findings 1 to 5 as follows.

1. An adhesive including a multivalent vinyl ether compound and a compound containing two or more hydroxy groups or two or more carboxy groups has a viscosity that is easily controllable by adjusting proportions of the two compounds. The adhesive can provide for various coating methods and for desired thicknesses as appropriate and has excellent coatability.

2. The adhesive, when subjected to a heat treatment, undergoes polymerization, via acetal bonding, between the multivalent vinyl ether compound and the compound containing two or more hydroxy groups or two or more carboxy groups and gives a thermoplastic polymer having a softening point or melting point in a high-temperature range of 160° C. or higher.

3. The polymer can maintain adhesiveness at a temperature lower than the softening point or melting point. Specifically, the polymer can maintain adhesiveness even in a high-temperature environment of around 160° C.

4. The polymer, when heated at a temperature equal to or higher than the softening point or melting point, immediately softens or liquefies to lose part or all of the adhesiveness.

5. The polymer has acetal-bonding moieties (acetal bonds) which are easily decomposable by the action of an acid. The polymer, when subjected to an acid treatment before heating, immediately softens or liquefies to lose part or all of the adhesiveness even when heated at a temperature lower than the softening point or melting point of the polymer.

The present invention has been made based on these findings.

Specifically, the present invention provides, according to one aspect, an adhesive containing a multivalent vinyl ether compound (A) and at least one of a compound (B) and a compound (C). The compound (B) is represented by Formula (b). The compound (C) includes two or more constitutional units each represented by Formula (c). Formulae (b) and (c) are expressed as follows:

[Chem. 1]

(b)

where $Z_1$ represents a group corresponding to a compound selected from the group consisting of saturated or unsaturated aliphatic hydrocarbons, saturated or unsaturated alicyclic hydrocarbons, aromatic hydrocarbons, heterocyclic compounds, and compounds including two or more of them bonded to one another with or without medium of a linkage group, except for removing hydrogen atoms in the number of $n_1$ from the structural formula of the corresponding compound; X is selected from a hydroxy group and a carboxy group; and $n_1$ represents an integer of 2 or more, where $n_1$ occurrences of X may be identical to or different from each other,

[Chem. 2]

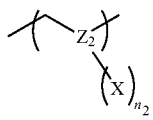
(c)

where $Z_2$ represents a group corresponding to a compound selected from the group consisting of saturated or unsaturated aliphatic hydrocarbons, saturated or unsaturated alicyclic hydrocarbons, aromatic hydrocarbons, heterocyclic compounds, and compounds including two or more of them bonded to one another with or without medium of a linkage group, except for removing hydrogen atoms in the number of ($n_2+2$) from the structural formula of the corresponding compound; X is selected from a hydroxy group and a carboxy group; and $n_2$ represents an integer of 1 or more, where $n_2$ occurrence(s) of X may be identical to or different from each other.

In the adhesive, the multivalent vinyl ether compound (A) may be a compound represented by Formula (a):

[Chem. 3]

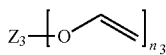
(a)

where $Z_3$ represents a group corresponding to a compound selected from the group consisting of saturated or unsaturated aliphatic hydrocarbons, saturated or unsaturated alicyclic hydrocarbons, aromatic hydrocarbons, heterocyclic compounds, and compounds including two or more of them bonded to one another with or without medium of a linkage group, except for removing hydrogen atoms in the number of $n_3$ from the structural formula of the corresponding compound; and $n_3$ represents an integer of 2 or more.

The adhesive may further contain an acid generator.

In the adhesive, the compound (C) may have a weight-average molecular weight of 1500 or more as determined by GPC and calibrated with a polystyrene standard.

The adhesive may contain 0.5% to 80% by weight of the multivalent vinyl ether compound (A) and 20% to 99.5% by weight in total of the at least one of the compound (B) and the compound (C), based on the total amount of polymerizable compounds contained in the adhesive.

The adhesive may further contain at least one of a monovalent carboxylic acid represented by Formula (d) and a monohydric alcohol represented by Formula (e). Formulae (d) and (e) are expressed as follows:

$Z_4$—COOH (d)

where $Z_4$ represents a group corresponding to a compound selected from the group consisting of saturated or unsaturated aliphatic hydrocarbons, saturated or unsaturated alicyclic hydrocarbons, and aromatic hydrocarbons, each of which may have one or more substituents excluding carboxy groups, except for removing one hydrogen atom from the structural formula of the corresponding compound,

$Z_5$—OH (e)

where $Z_5$ represents a group corresponding to an aromatic hydrocarbon which may have one or more substituents excluding hydroxy groups, except for removing one hydrogen atom from the structural formula of the aromatic hydrocarbon.

The adhesive may further contain a surfactant.

The present invention also provides, according to another aspect, a method for temporarily securing an adherend to a support using an adhesive. The method includes a securing step and a removing step. In the securing step, the adhesive is subjected to a heat treatment to give a polymer derived from the multivalent vinyl ether compound (A) and at least one of the compound (B) represented by Formula (b) and the compound (C) including two or more constitutional units each represented by Formula (c), and the adherend is secured to the support via the polymer. In the removing step, the polymer is subjected to a heat treatment, or to light irradiation and the heat treatment, to soften or liquefy, and the adherend is thereby removed from the support.

The present invention provides, according to yet another aspect, a method for processing an adherend, where the adherend is temporarily secured using an adhesive. The method includes a securing step, a processing step, and a removing step. In the securing step, the adhesive is subjected to a heat treatment to give a polymer derived from the multivalent vinyl ether compound (A) and at least one of the compound (B) represented by Formula (b) and the compound (C) including two or more constitutional units each represented by Formula (c), and the adherend is secured to a support via the polymer. In the processing step, the secured adherend is processed. In the removing step, the polymer is subjected to a heat treatment, or to light irradiation and the heat treatment, to soften or liquefy, and the adherend is thereby removed from the support.

According to still another aspect, the present invention provides an adhesive film. The adhesive film is prepared by applying the adhesive to give a film of the adhesive, and subjecting the film of the adhesive to a heat treatment. The adhesive film includes a polymer derived from the multivalent vinyl ether compound (A) and at least one of the compound (B) represented by Formula (b) and the compound (C) including two or more constitutional units each represented by Formula (c).

Specifically, the present invention relates to followings.

(1) The present invention relates to an adhesive containing a multivalent vinyl ether compound (A) and at least one of a compound (B) and a compound (C). The compound (B) is represented by Formula (b). The compound (C) includes two or more constitutional units each represented by Formula (c).

(2) The multivalent vinyl ether compound (A) in the adhesive according to (1) may be a compound represented by Formula (a).

(3) The multivalent vinyl ether compound (A) in the adhesive according to one of (1) or (2) may be at least one compound selected from the group consisting of compounds represented by Formulae (a-1) to (a-21).

(4) The compound (B) in the adhesive according to any one of (1) to (3) may be at least one compound selected from the group consisting of compounds represented by Formulae (b-1) to (b-10).

(5) The compound (C) in the adhesive according to any one of (1) to (4) may be a polymerizable compound including two or more of at least one constitutional unit selected from the group consisting of constitutional units represented by Formulae (c-1) to (c-6).

(6) The compound (C) in the adhesive according to any one of (1) to (5) may be a copolymer including the constitutional units each represented by Formula (c), and a constitutional unit derived from at least one polymerizable monomer selected from the group consisting of chain olefins, cyclic olefins, aromatic vinyl compounds, unsaturated carboxylic acid esters, carboxylic acid vinyl esters, and unsaturated dicarboxylic acid diesters.

(7) The adhesive according to any one of (1) to (6) may further contain an acid generator.

(8) The acid generator in the adhesive according to any one of (1) to (7) may be a compound that generates a perfluoroalkanesulfonic acid or a perfluorophosphonium sulfonic acid via light irradiation.

(9) The compound (C) in the adhesive according to any one of (1) to (8) may have a weight-average molecular weight of 1500 or more as determined by GPC and calibrated with a polystyrene standard.

(10) The adhesive according to any one of (1) to (9) may contain 0.5% to 80% by weight of the multivalent vinyl ether compound (A) and 20% to 99.5% by weight in total of the at least one of the compound (B) and the compound (C), based on the total amount of polymerizable compounds contained in the adhesive.

(11) The adhesive according to any one of (1) to (10) may contain 3% to 80% by weight of the multivalent vinyl ether compound (A) and 20% to 95% by weight in total of the at least one of the compound (B) and the compound (C), based on the total amount of polymerizable compounds contained in the adhesive.

(12) The adhesive according to any one of (1) to (11) may contain the multivalent vinyl ether compound (A) in an amount of 5% to 30% by weight of all polymerizable compounds contained in the adhesive, the compound (B) in an amount of 3% to 20% by weight of all the polymerizable compounds contained in the adhesive, and the compound (C) in an amount of 50% to 90% by weight of all the polymerizable compounds contained in the adhesive.

(13) The adhesive according to any one of (1) to (12) may contain the multivalent vinyl ether compound (A), the compound (B), and the compound (C) in such contents (in weight) as to meet conditions specified as follows.

The ratio of the total of the compound (B) and the compound (C) to the multivalent vinyl ether compound (A) is from 1.5 to 15. The ratio (in weight) of the compound (B) to the total of the compound (B) and the compound (C) is from greater than 0 to 0.5. The ratio (in weight) of the compound (C) to the total of the compound (B) and the compound (C) is from 0.15 to less than 1.0.

(14) The adhesive according to any one of (1) to (13) may contain the multivalent vinyl ether compound (A) in an amount of 20% to 60% by weight of all polymerizable compounds contained in the adhesive, and the compound (B) in an amount of 30% to 80% by weight of all the polymerizable compounds contained in the adhesive.

(15) The adhesive according to any one of (1) to (14) may contain the multivalent vinyl ether compound (A) and the compound (B) in such contents (in weight) that the ratio of the multivalent vinyl ether compound (A) to the compound (B) is from 0.8 to 1.5.

(16) The adhesive according to any one of (1) to (15) may further contain at least one of a monovalent carboxylic acid represented by Formula (d) and a monohydric alcohol represented by Formula (e).

(17) In the adhesive according to (16), at least one of the monovalent carboxylic acid represented by Formula (d) and the monohydric alcohol represented by Formula (e) may have a pKa of 3 to 8.

(18) The adhesive according to one of (16) and (17) may contain the at least one of the monovalent carboxylic acid represented by Formula (d) and the monohydric alcohol represented by Formula (e) in an amount in total of 0.1 to 10 parts by weight per 100 parts by weight of all polymerizable compounds contained in the adhesive.

(19) The adhesive according to any one of (1) to (18) may further contain a surfactant.

(20) The adhesive according to (19) may contain the surfactant in an amount of 0.01% to 1% by weight based on the total amount of the adhesive.

(21) The adhesive according to any one of (1) to (20) may have a viscosity of 50 to 600 mPa·s at 25° C.

(22) The present invention also relates to a method for temporarily securing an adherend to a support using an adhesive. The method includes a securing step and a removing step. In the securing step, the adhesive according to any one of (1) to (21) is subjected to a heat treatment to give a polymer derived from the multivalent vinyl ether compound (A) and at least one of the compound (B) represented by Formula (b) and the compound (C) including two or more constitutional units each represented by Formula (c). The adherend is secured to the support via the polymer. In the removing step, the polymer is subjected to a heat treatment, or to light irradiation and the heat treatment, to soften or liquefy. The adherend is thereby removed from the support.

(23) The present invention also relates to a method for temporarily securing an adherend to a support using an adhesive. The method includes a securing step and a removing step. In the securing step, the adhesive according to any one of (1) to (21) is applied to at least one of the adherend and the support, and the applied adhesive is subjected to a heat treatment to give a polymer derived from the multivalent vinyl ether compound (A) and at least one of the compound (B) represented by Formula (b) and the compound (C) including two or more constitutional units each represented by Formula (c). The adherend is secured to the support via the polymer. In the removing step, the polymer is subjected to a heat treatment, or to light irradiation and the heat treatment, to soften or liquefy. The adherend is thereby removed from the support.

(24) The present invention also relates to a method for processing an adherend, where the adherend is temporarily secured using an adhesive. The method includes a securing step, a processing step, and a removing step. In the securing step, the adhesive according to any one of (1) to (21) is subjected to a heat treatment to give a polymer derived from the multivalent vinyl ether compound (A) and at least one of the compound (B) represented by Formula (b) and the compound (C) including two or more constitutional units each represented by Formula (c), and the adherend is secured to a support via the polymer. In the processing step, the secured adherend is processed. In the removing step, the polymer is subjected to a heat treatment, or to light irradiation and the heat treatment, to soften or liquefy. The adherend is thereby removed from the support.

(25) The present invention also relates to a method for processing an adherend, where the adherend is temporarily secured using an adhesive. The method includes a securing step, a processing step, and a removing step. In the securing step, the adhesive according to any one of (1) to (21) is applied to at least one of the adherend and a support, and the applied adhesive is subjected to a heat treatment to give a polymer derived from the multivalent vinyl ether compound (A) and at least one of the compound (B) represented by Formula (b) and the compound (C) including two or more constitutional units each represented by Formula (c). The adherend is secured to the support via the polymer. In the processing step, the secured adherend is processed. In the removing step, the polymer is subjected to a heat treatment, or to light irradiation and the heat treatment, to soften or liquefy. The adherend is thereby removed from the support.

(26) In addition, the present invention relates to an adhesive film. The adhesive film is obtained by applying the adhesive according to any one of (1) to (21) to give a film of the adhesive, and subjecting the film of the adhesive to a heat treatment. The adhesive film includes a polymer derived from the multivalent vinyl ether compound (A) and at least one of the compound (B) represented by Formula (b) and the compound (C) including two or more constitutional units each represented by Formula (c).

Advantageous Effects of Invention

The adhesive according to the present invention has the configuration and maintains high adhesiveness to bond and secure an adherend even in a high-temperature environment, as long as the securing of the adherend is necessary. Once the securing of the adherend becomes unnecessary, the adhesive, when subjected typically to a heat treatment, allows the adherend to be easily removed without adherend failure. The adhesive remained on the adherend after removal (i.e., adhesive residue) can be easily dissolved and removed by washing with a solvent. The adhesive according to the present invention is therefore advantageously usable as an adhesive for temporary securing of a fragile adherend and, in particular, is preferably usable as an adhesive for temporary securing of a thinned semiconductor chip in a production process of the chip.

DESCRIPTION OF EMBODIMENTS

Adhesive

The adhesive according to the present invention contains, as polymerizable compounds, the multivalent vinyl ether compound (A) and at least one of the compound (B) and the compound (C). The compound (B) is represented by Formula (b). The compound (C) includes two or more constitutional units each represented by Formula (c). The adhesive according to the present invention may further contain an acid generator.

Multivalent Vinyl Ether Compound (A)

The multivalent vinyl ether compound (A) for use in the present invention is hereinafter also referred to as a "compound (A)". The compound (A) is an essential component of the adhesive according to the present invention. The compound (A) is a compound containing two or more vinyl ether groups per molecule and is represented typically by Formula (a):

[Chem. 4]

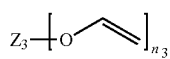

In Formula (a), $Z_3$ represents a group corresponding to a compound selected from the group consisting of saturated or unsaturated aliphatic hydrocarbons, saturated or unsaturated alicyclic hydrocarbons, aromatic hydrocarbons, heterocyclic compounds, and compounds including two or more of them bonded to one another through the medium of a linkage group, or without the medium of a linkage group (namely, bonded via a single bond), except for removing hydrogen atoms in the number of $n_3$ from the structural formula of the corresponding compound.

Of the groups corresponding to the saturated or unsaturated aliphatic hydrocarbons, except for removing hydrogen atoms in the number of $n_3$ each from the structural formula of the corresponding compound, groups corresponding to saturated or unsaturated aliphatic hydrocarbons, except for removing two hydrogen atoms each from the structural formula of the corresponding compound are exemplified by, but are not limited to, straight or branched chain alkylene groups such as methylene, ethylene, propylene, trimethylene, tetramethylene, pentamethylene, hexamethylene, octamethylene, decamethylene, and dodecamethylene groups, of which $C_1$-$C_{20}$ alkylene groups are typified, and $C_1$-$C_{10}$ alkylene groups are preferred; and straight or branched chain alkenylene groups such as vinylene, 1-propenylene, and 3-methyl-2-butenylene groups, of which $C_2$-$C_{20}$ alkenylene groups are typified, and $C_2$-$C_{10}$ alkenylene groups are preferred. Groups corresponding to saturated or unsaturated aliphatic hydrocarbons, except for removing three or more hydrogen atoms from the structural formula of the corresponding compound, are exemplified by groups corresponding to the above-exemplified groups, except for each further removing one or more hydrogen atoms from the structural formula of the corresponding group.

Of the groups corresponding to saturated or unsaturated alicyclic hydrocarbons, except for removing hydrogen atoms in the number of $n_3$ from the structural formula of the corresponding compound, groups corresponding to saturated or unsaturated alicyclic hydrocarbons, except for removing two hydrogen atoms from the structural formula of the corresponding compound, are exemplified by, but not limited to, cycloalkylene groups such as 1,2-cyclopentylene, 1,3-cyclopentylene, 1,2-cyclohexylene, 1,3-cyclohexylene, and 1,4-cyclohexylene groups, of which 3- to 15-membered cycloalkylene groups are typified; cycloalkenylene groups such as cyclopentenylene and cyclohexenylene groups, of which 3- to 15-membered cycloalkenylene groups are typified; cycloalkylidene groups such as cyclopentylidene and cyclohexylidene groups, of which 3- to 15-membered cycloalkylidene groups are typified; and divalent bridged hydrocarbon groups such as adamantanediyl, norbornanediyl, norbornenediyl, isobornanediyl, tricyclodecanediyl, tricycloundecanediyl, and tetracyclododecanediyl groups, of which 4- to 15-membered divalent bridged groups are typified. Groups corresponding to saturated or unsaturated alicyclic hydrocarbons, except for removing three or more hydrogen atoms from the structural formula of the corresponding compound, are exemplified by, but not limited to, groups corresponding to the above-exemplified groups, except for further removing one or more hydrogen atoms from the structural formula of the corresponding group.

Examples of the aromatic hydrocarbons include, but are not limited to, benzene, naphthalene, and anthracene.

The heterocyclic compounds include aromatic heterocyclic compounds and non-aromatic heterocyclic compounds. Examples of the heterocyclic compounds include, but are not limited to, heterocyclic compounds containing an oxygen atom as a heteroatom; heterocyclic compounds containing a sulfur atom as a heteroatom; and heterocyclic compounds containing a nitrogen atom as a heteroatom. Examples of the oxygen-containing heterocyclic compounds include, but are not limited to, 5-membered rings such as furan, tetrahydrofuran, oxazole, isoxazole, and γ-butyrolactone rings; 6-membered rings such as 4-oxo-4H-pyran, tetrahydropyran, and morpholine rings; fused rings such as benzofuran, isobenzofuran, 4-oxo-4H-chromene, chroman, and isochroman rings; and bridged rings such as 3-oxatricyclo[4.3.1.1$^{4,8}$]undecan-2-one and 3-oxatricyclo[4.2.1.0$^{4,8}$]nonan-2-one rings. Examples of the sulfur-containing heterocyclic compounds include, but are not limited to, 5-membered rings such as thiophene, triazole, isothiazole, and thiadiazole rings; 6-membered rings such as 4-oxo-4H-thiopyran ring; and fused rings such as benzothiophene ring. Examples of the nitrogen-containing heterocyclic compounds include, but are not limited to, 5-membered rings such as pyrrole, pyrrolidine, pyrazole, imidazole, and triazole rings; 6-membered rings such as pyridine, pyridazine, pyrimidine, pyrazine, piperidine, and piperazine rings; and fused rings such as indole, indoline, quinoline, acridine, naphthyridine, quinazoline, and purine rings.

Non-limiting examples of the linkage group include di- to tetra-valent hydrocarbon groups, carbonyl group (—CO—), ether bond (—O—), sulfide bond (—S—), ester bond (—COO—), amide bond (—CONH—), carbonate bond (—OCOO—), urethane bond (—NHCOO—), —NR— bond (where R is selected from a hydrogen atom, an alkyl group, and an acyl group), and groups each including two or more of them linked to each other. Of the di- to tetra-valent hydrocarbon groups, divalent hydrocarbon groups are exemplified by, but are not limited to, straight or branched chain $C_2$-$C_{10}$ alkylene groups such as methylene, methylmethylene, dimethylmethylene, ethylene, propylene, and trimethylene groups; and $C_4$-$C_{15}$ alicyclic hydrocarbon groups such as 1,2-cyclopentylene, 1,3-cyclopentylene, cyclopentylidene, 1,2-cyclohexylene, 1,3-cyclohexylene, 1,4-cyclohexylene, and cyclohexylidene groups, of which cycloalkylene groups are particularly typified. Non-limiting examples of the trivalent hydrocarbon groups include groups corresponding to the divalent hydrocarbon groups, except for further removing one hydrogen atom from the structural formula of the corresponding divalent group. Non-limiting examples of the tetravalent hydrocarbon groups include groups corresponding to the divalent hydrocarbon groups, except for further removing two hydrogen atoms from the structural formula of the corresponding divalent group.

The group $Z_3$ may have one or more substituents. Examples of the substituents include, but are not limited to, alkyl groups including $C_1$-$C_4$ alkyl groups such as methyl and ethyl groups; cycloalkyl groups such as $C_4$-$C_{10}$ cycloalkyl groups; alkenyl groups including $C_3$-$C_{10}$ alkenyl groups such as vinyl group; cycloalkenyl groups such as $C_4$-$C_{10}$ cycloalkenyl groups; aryl groups including $C_6$-$C_{15}$ aryl groups such as phenyl and naphthyl groups; hydroxy group; carboxy group; nitro group; amino group; mercapto group; halogen atoms; halogen-substituted $C_2$-$C_{10}$ hydrocarbon groups; hydrocarbon groups, such as $C_1$-$C_4$ alkoxy groups and $C_2$-$C_6$ acyloxy groups, each containing a functional group containing a heteroatom (e.g., oxygen and/or sulfur); and groups each including two or more of them bonded to one another.

In Formula (a), $n_3$ represents an integer of 2 or more and is typically an integer of 2 to 5, and preferably an integer of 2 or 3.

Examples of the compound (A) include, but are not limited to, 1,4-butanediol divinyl ether, diethylene glycol divinyl ether, triethylene glycol divinyl ether, and compounds represented by the formulae:

[Chem. 5]

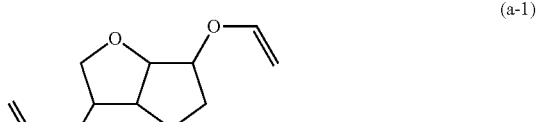
(a-1)

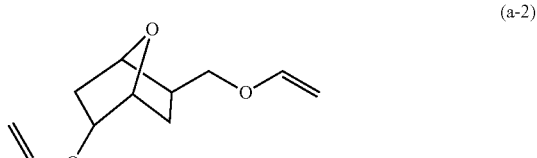
(a-2)

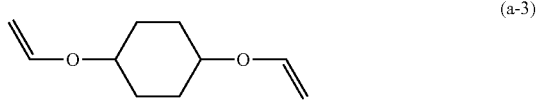
(a-3)

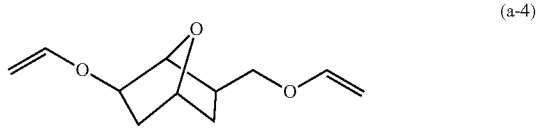
(a-4)

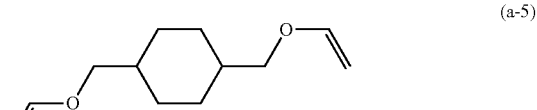
(a-5)

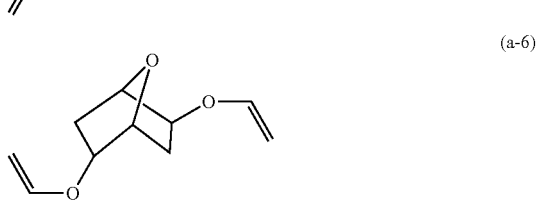
(a-6)

(a-7)

(a-8)

(a-9)

(a-10)
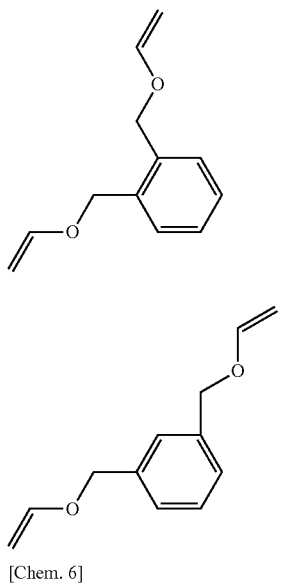
(a-11)
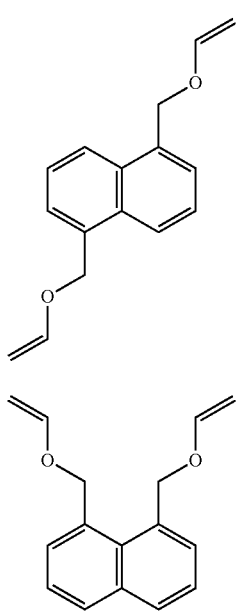
[Chem. 6]
(a-12)
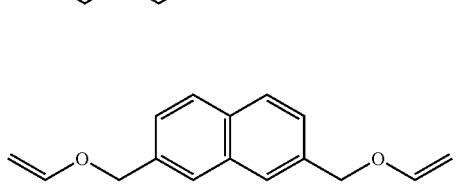
(a-13)
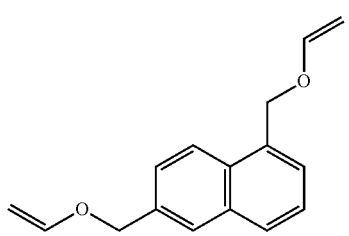
(a-14)
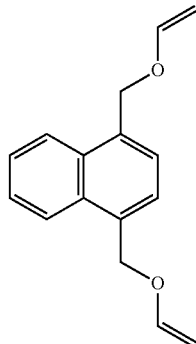
(a-15)
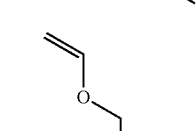
(a-16)
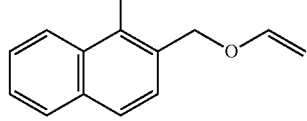
(a-17)
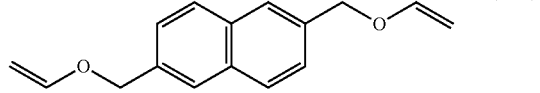
(a-18)
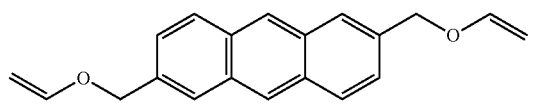
(a-19)
(a-20)
(a-21)
Among them, the group $Z_3$ herein is preferably a group corresponding to a compound selected from the group consisting of heterocyclic compounds, bridged hydrocarbons, and aromatic hydrocarbons, except for removing hydrogen atoms in the number of $n_3$ from the structural formula of the corresponding compound. This is preferred for the formation of a polymer having a high softening point or melting point. The group $Z_3$ herein is preferably devoid of epoxy groups and/or oxetane structures.

Compound (B)

The compound (B) for use in the present invention is a polymerizable compound represented by Formula (b):

[Chem. 7]

(b)

In Formula (b), X is selected from a hydroxy group and a carboxy group, where $n_1$ occurrences of X may be identical to or different from each other.

In Formula (b), $n_1$ represents an integer of 2 or more and is typically an integer of 2 to 5, and preferably an integer of 2 to 4.

In Formula (b), $Z_1$ represents a group corresponding to a compound selected from the group consisting of saturated or unsaturated aliphatic hydrocarbons, saturated or unsaturated alicyclic hydrocarbons, aromatic hydrocarbons, heterocyclic compounds, and compounds including two or more of them bonded to one another with or without medium of a linkage group, except for removing hydrogen atoms in the number of $n_1$ from the structural formula of the corresponding compound. The structural formulae corresponding to the saturated or unsaturated aliphatic hydrocarbons, saturated or unsaturated alicyclic hydrocarbons, aromatic hydrocarbons, heterocyclic compounds, and compounds including two or more of them bonded to one another with or without medium of a linkage group are exemplified as in $Z_3$.

When X in each occurrence is a hydroxy group, $Z_1$ herein is preferably, in particular, a group corresponding to an aromatic hydrocarbon, except for removing hydrogen atoms in the number of $n_1$ from the structural formula of the aromatic hydrocarbon. Namely, the compound (B) is preferably selected typically from bisphenols, hydroquinone, and trivalent phenols. This is preferred because the compound (B) of this configuration contributes to the formation of a polymer that offers excellent solubility in a solvent and excellent reactivity and has a high softening point or melting point. When X is a carboxy group, $Z_1$ is preferably, in particular, a group corresponding to a compound selected from the group consisting of saturated or unsaturated aliphatic hydrocarbons and saturated or unsaturated alicyclic hydrocarbons, except for removing hydrogen atoms in the number of $n_1$ from the structural formula of the corresponding compound. This is preferred because the compound (B) of this configuration contributes to the formation of a polymer that offers excellent solubility in a solvent and excellent reactivity and has a high softening point or melting point.

Non-limiting examples of the compound (B) include compounds as follows:

[Chem. 8]

(b-1)
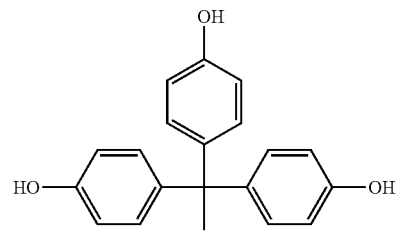

(b-2)
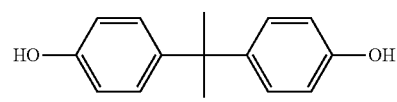

(b-3)
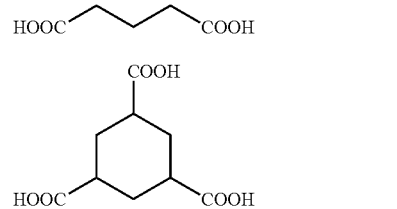

(b-4)
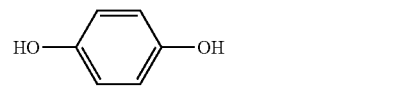

(b-5)
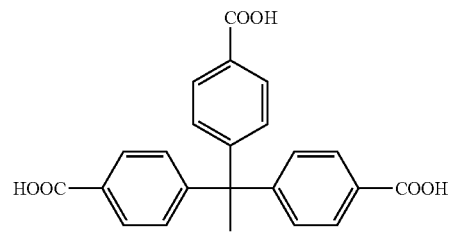

(b-6)
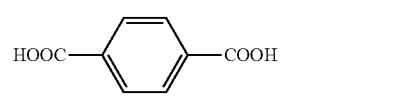

(b-7)
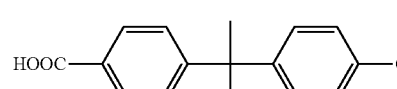

(b-8)
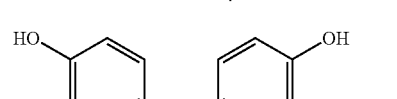

(b-9)
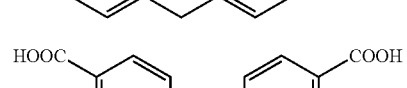

(b-10)
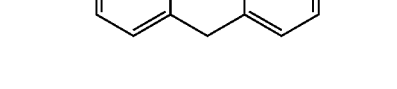

Compound (C)

The compound (C) for use in the present invention is a polymerizable compound having two or more constitutional units (constitutional repeating units) independently represented by Formula (c):

[Chem. 9]

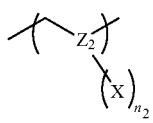
(c)

In Formula (c), X is selected from a hydroxy group and a carboxy group, where $n_2$ occurrence(s) of X may be identical to or different from each other.

In Formula (c), $n_2$ represents an integer of 1 or more. In particular, $n_2$ is preferably an integer of 1 to 3, and particularly preferably an integer of 1 or 2. This is preferred because the compound (C) of this configuration is easily available and contributes to the formation of a polymer that offers excellent solubility in a solvent and has a high softening point or melting point.

The number of the constitutional units (constitutional repeating units) represented by Formula (c) in the compound (C) is 2 or more, and is preferably an integer of 2 to 40, and particularly preferably an integer of 10 to 30. This is preferred, in particular, for the formation of a polymer having a high softening point or melting point.

In Formula (c), $Z_2$ represents a group corresponding to a compound selected from the group consisting of saturated or unsaturated aliphatic hydrocarbons, saturated or unsaturated alicyclic hydrocarbons, aromatic hydrocarbons, heterocyclic compounds, and compounds including two or more of them bonded to one another with or without medium of a linkage group, except for removing hydrogen atoms in the number of ($n_2+2$) from the structural formula of the corresponding compound. Examples of the structural formulae of the saturated or unsaturated aliphatic hydrocarbons, saturated or unsaturated alicyclic hydrocarbons, aromatic hydrocarbons, heterocyclic compounds, and compounds including two or more of them bonded to one another with or without medium of a linkage group are as in $Z_3$.

When X in each occurrence is a hydroxy group, $Z_2$ is preferably, in particular, a group containing a benzene ring and having a valency of ($n_2+2$). This is preferred because the compound (C) of this configuration is easily available and contributes to the formation of a polymer that offers excellent solubility in a solvent and has a high softening point or melting point. When X in each occurrence is a carboxy group, $Z_2$ is preferably, in particular, selected from saturated aliphatic hydrocarbon groups having a valency of ($n_2+2$), and is more preferably selected from saturated aliphatic hydrocarbon groups containing at least one of a tertiary carbon atom and a quaternary carbon atom. This is preferred because the compound (C) of this configuration is easily available and contributes to the formation of a polymer that offers excellent solubility in a solvent and has a high softening point or melting point.

Specifically, the compound (C) is preferably selected typically from styrenic polymers, (meth)acrylic polymers, poly(vinyl alcohol)s, novolac resins, and resol resins and is particularly preferably selected from polymerizable compounds containing two or more of at least one constitutional unit (constitutional repeating unit) selected from the group consisting of constitutional units represented by Formulae (c-1) to (c-6):

[Chem. 10]

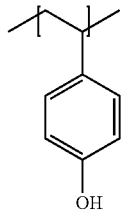
(c-1)

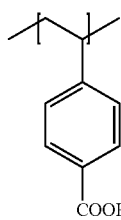
(c-2)

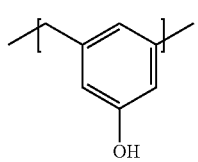
(c-3)

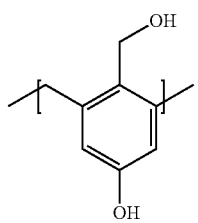
(c-4)

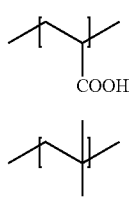
(c-5)

(c-6)

Assume that a compound in which X in Formula (c) is a hydroxy group is used as the compound (C). In this case, the compound (C) may include the constitutional units represented by Formula (c) in a proportion of preferably 30% by weight or more, particularly preferably 50% by weight or more, and most preferably 60% by weight or more, based on the total amount of the compound (C).

Assume that a compound in which X in Formula (c) is a carboxy group is used as the compound (C). In this case, the compound (C) may include the constitutional units represented by Formula (c) in a proportion of preferably 1% by weight or more, particularly preferably 5% by weight or more, and most preferably 10% by weight or more, based on the total amount of the compound (C).

The compound (C), if including the constitutional units represented by Formula (c) in a proportion less than the range, gives, via polymerization with the compound (A), a polymer that has a low weight-average molecular weight and less maintains its adhesiveness in a high-temperature environment. This is because this polymer includes crosslinking points at longer spacing from each other and/or includes a smaller number of crosslinking points.

Specifically, the compound (C) for use in the present invention may be a homopolymer having the constitutional units represented by Formula (c) alone, or a copolymer having the constitutional units represented by Formula (c) in combination with one or more other constitutional units. The compound (C), when being a copolymer, may be any of block copolymers, graft copolymers, and random copolymers.

The other constitutional units are constitutional units derived from polymerizable monomers each devoid of hydroxy groups and carboxy groups. Examples of such polymerizable monomers include, but are not limited to, olefins, aromatic vinyl compounds, unsaturated carboxylic acid esters, carboxylic acid vinyl esters, and unsaturated dicarboxylic acid diesters. Non-limiting examples of the olefins include chain olefins such as ethylene, propylene, and 1-butene, of which $C_2$-$C_{12}$ alkenes are typified; and cyclic olefins such as cyclopentene, cyclohexene, cycloheptene, norbornene, 5-methyl-2-norbornene, and tetracyclodo-decene, of which $C_3$-$C_{10}$ cycloalkenes are typified. Non-limiting examples of the aromatic vinyl compounds include $C_6$-$C_{14}$ aromatic vinyl compounds such as styrene, vinyltoluene, a-methylstyrene, 1-propenylbenzene, 1-vinylnaphthalene, 2-vinylnaphthalene, 3-vinylpyridine, 3-vinylfuran, 3-vinylthiophene, 3-vinylquinoline, indene, methylindene, ethylindene, and dimethylindene. Non-limiting examples of the unsaturated carboxylic acid esters include esters obtained by reacting an unsaturated carboxylic acid with an alcohol represented by R"—OH, such as ethyl (meth)acrylate, butyl (meth)acrylate, isobutyl (meth)acrylate, 2-ethylhexyl (meth)acrylate, and dicyclopentanyl (meth)acrylate. A non-limiting example of the unsaturated carboxylic acid is (meth)acrylic acid. In the alcohol represented by R"—OH, R" is a group corresponding to a compound selected from the group consisting of saturated or unsaturated aliphatic hydrocarbons, saturated or unsaturated alicyclic hydrocarbons, aromatic hydrocarbons, heterocyclic compounds, and compounds including two or more of them bonded to one another with or without the medium of a linkage group, except for removing one hydrogen atom from the structural formula of the corresponding compound. The group R" is exemplified by monovalent groups corresponding to the examples of $Z_3$ in Formula (a). Non-limiting examples of the carboxylic acid vinyl esters include vinyl esters of $C_1$-$C_{16}$ fatty acids, such as vinyl acetate, vinyl propionate, vinyl caprylate, and vinyl caproate. Non-limiting examples of the unsaturated dicarboxylic acid diesters include maleic acid di-($C_1$-$C_{10}$ alkyl) esters, such as diethyl maleate, dibutyl maleate, dioctyl maleate, and 2-ethylhexyl maleate; and fumaric acid diesters corresponding to them. Each of them may be used alone or in combination.

The compound (C), when being a copolymer, is preferably selected from, in particular, compounds including the constitutional units represented by Formula (c) and one or more constitutional units derived from at least one polymerizable monomer selected from the group consisting of chain olefins, cyclic olefins, aromatic vinyl compounds, unsaturated carboxylic acid esters, carboxylic acid vinyl esters, and unsaturated dicarboxylic acid diesters.

The compound (C) has a weight-average molecular weight of typically 1500 or more, preferably 1800 to 10000, and particularly preferably 2000 to 5000, as determined by GPC and calibrated with a polystyrene standard. In an embodiment, the adhesive contains a compound (C) having a weight-average molecular weight within the range. This adhesive gives a polymer that has a higher softening point or melting point and maintains adhesiveness even in an environment at a still higher temperature (e.g., about 160° C. to about 180° C.), as compared with an adhesive devoid of the compound (C) according to this embodiment. In addition, the adhesive containing the compound (C) according to this embodiment has an appropriate viscosity, is applicable by squeegee coating, and easily forms a thick coating layer.

The adhesive according to the present invention may contain at least one of the compound (B) and the compound (C). The adhesive may contain the compound (B) alone, or the compound (C) alone, or both the compound (B) and the compound (C).

The adhesive according to the present invention may contain the compound (A) in a proportion (blending amount) of typically 0.5% to 80% by weight, preferably about 3% to about 80% by weight, more preferably 5% to 70% by weight, and particularly preferably 10 to 60% by weight, of all polymerizable compounds contained in the adhesive. The adhesive may contain each of different compounds alone or in combination as the compound (A). When the adhesive contains two or more different compounds as the compound (A), the proportion (content) refers to the total proportion of the two or more different compounds as the compound (A). The adhesive, when containing the compound (A) in a proportion within the range, forms, upon heating, a polymer having a softening point or melting point in a high-temperature range of 160° C. or higher. This configuration contributes to adhesiveness that is satisfactorily maintained even in a high-temperature environment.

The adhesive according to the present invention may contain at least one of the compound (B) and the compound (C) in a total proportion (blending amount) of typically 20% to 99.5% by weight, preferably 20% to 95% by weight, more preferably 30% to 90% by weight, and particularly preferably 40% to 85% by weight, of all polymerizable compounds contained in the adhesive. When the adhesive contains both the compound (B) and the compound (C), the proportion refers to the total proportion of the two compounds. The adhesive may contain each of different compounds alone or in combination as the compound (B). Likewise, the adhesive may contain each of different compounds alone or in combination as the compound (C). When the adhesive contains two or more different compounds as the compound (B) and/or as the compound (C), the proportion (content) refers to the total proportion of the two or more different compounds. Assume that such adhesive containing at least one of the compound (B) and the compound (C) in a total proportion within the range is polymerized with the compound (A) upon heating. This gives a polymer that has a softening point or melting point in a high-temperature range of 160° C. or higher and offers excellent adhesiveness even in a high-temperature environment.

Among the adhesives according to the present invention, preferred are adhesives having a configuration (1) or a configuration (2) relating to combination of the components. Namely, preferred are adhesives that contain the compound (A) and the compound (B) as essential components. Advantageously, these adhesives can offer excellent adhesiveness even in a high-temperature environment, have appropriate viscosity, are coatable (applicable) typically by squeegee coating or spin coating, and forms a thick coating layer. In particular, the adhesive having the configuration (1) can maintain adhesiveness even in an environment at a still higher temperature (e.g., about 160° C. to about 180° C.)

In the configuration (1), the adhesive contains all the compound (A), the compound (B), and the compound (C).

In the configuration (2), the adhesive contains the compound (A) and the compound (B), but is devoid of the compound (C).

The adhesive having the configuration (1) preferably contains the components in proportions within ranges below and in such proportions as to meet conditions below.

The proportion of the compound (A) is preferably 5% to 30% by weight, and more preferably 5% to 25% by weight, of all polymerizable compounds contained in the adhesive.

The proportion of the compound (B) is preferably 3% to 20% by weight, and more preferably 3% to 10% by weight, of all the polymerizable compounds contained in the adhesive.

The proportion of the compound (C) is preferably 50% to 90% by weight, and more preferably 60% to 85% by weight, of all the polymerizable compounds contained in the adhesive.

The ratio (in weight) of the total of compound (B) and the compound (C) to the compound (A) is preferably from about 1.5 to about 15, more preferably from 2 to 12, and particularly preferably from 3 to 10.

The ratio (in weight) of the compound (B) to the total of the compound (B) and the compound (C) is preferably from greater than 0 to about 0.5, more preferably from 0.05 to 0.4, and particularly preferably from 0.05 to 0.3.

The ratio (in weight) of the compound (C) to the total of the compound (B) and the compound (C) is preferably from about 0.15 to less than about 1.0, more preferably from 0.25 to 0.98, particularly preferably from 0.3 to 0.95, and most preferably from 0.5 to 0.95.

The adhesive having the configuration (2) preferably contains the components in proportions within ranges below and preferably contains the components in such proportions as to meet conditions below.

The proportion of the compound (A) is preferably 20% to 60% by weight, and more preferably 30% to 50% by weight, of all polymerizable compounds contained in the adhesive.

The proportion of the compound (B) is preferably 30% to 80% by weight, and more preferably 40% to 70% by weight, of all polymerizable compounds contained in the adhesive.

The ratio (in weight) of the compound (A) to the compound (B) is preferably from about 0.8 to about 1.5, and more preferably from 0.5 to 1.4.

In an embodiment, the compound (B) in the adhesive according to the present invention is devoid of the compound represented by Formula (b) in which $n_1$ is an integer of 3 or more. The adhesive according to this embodiment of the present invention preferably contains the components in proportions within ranges as follows.

The proportion of the compound (A) is typically 0.5% to 40.0% by weight, preferably 0.5% to 25.0% by weight, particularly preferably 1.0% to 15.0% by weight, and most preferably 2.0% to 15.0% by weight, of all polymerizable compounds contained in the adhesive.

The proportion of the compound (B) is typically 0.2% to 20% by weight, preferably 5.0% to 15.0% by weight, and particularly preferably 7.0% to 12.0% by weight, of all polymerizable compounds contained in the adhesive.

The proportion of the compound (C) is typically 50.0% to 99.0% by weight, preferably 60.0% to 95.0% by weight, particularly preferably 70.0% to 95.0% by weight, and most preferably 75.0% to 95.0% by weight, of all polymerizable compounds contained in the adhesive.

In another embodiment, the compound (B) in the adhesive according to the present invention includes the compound represented by Formula (b) in which $n_1$ is an integer of 3 or more. The adhesive according to this embodiment of the present invention preferably contains the components in proportions within ranges as follows and preferably contains the components in such ranges as to meet conditions as follows.

The proportion of compound (A) is typically 35.0% to 65.0% by weight, preferably 40.0% to 60.0% by weight, and particularly preferably 45.0% to 60.0% by weight, of all polymerizable compounds contained in the adhesive.

The proportion of the compound (B) is typically 35.0% to 65.0% by weight, preferably 40.0% to 60.0% by weight, and particularly preferably 45.0% to 60.0% by weight, of all polymerizable compounds contained in the adhesive.

The proportion of the compound represented by Formula (b) in which $n_1$ is an integer of 3 or more as the compound (B) is typically from greater than 0% by weight to 55.0% by weight, preferably 5.0% to 50.0% by weight, particularly preferably 10.0% to 50.0% by weight, furthermore preferably 20.0% to 50.0% by weight, and most preferably 30.0% to 45.0% by weight, of all polymerizable compounds contained in the adhesive.

The proportion of the compound (C) is typically 0% to 30.0% by weight, preferably 0% to 20.0% by weight, and particularly preferably 0% to 10.0% by weight, of all polymerizable compounds contained in the adhesive.

The ratio (in weight) of the compound (A) to the compound (B) is preferably from about 65:35 to about 35:65, more preferably from 60:40 to 40:60, and particularly preferably from 55:45 to 45:55.

Acid Generator

The acid generator is a compound including a cationic moiety and an anionic moiety. The cationic moiety absorbs heat or light. The anionic moiety acts as an acid source. Examples of the acid generator include thermal acid generators and photoacid generators. Each of them may be used alone or in combination. Assume that the adhesive according to the present invention contains the acid generator, and that the adhesive is polymerized to give a polymer. In this case, when heat or light is applied to the polymer to allow the acid generator to generate an acid, the polymer is decomposed and softens or liquefies to lose part or all of adhesiveness to thereby allow the adherend to be removed, at a lower temperature as compared with an adhesive devoid of acid generators. The polymer, when decomposed by the acid, is decomposed into low-molecular-weight fractions and can be more easily washed away with a solvent. This contributes to more easy cleanup of adhesive residue on the adherend after removal.

The thermal acid generators are compounds that generate a sulfonic acid (e.g., perfluoroalkylsulfonic acid), sulfonium cation, or any other substance by a heat treatment (in particular, a heat treatment at a temperature higher than the curing temperature). Non-limiting examples of the thermal acid generators include aryldiazonium salts, aryliodonium salts, arylsulfonium salts, and allene-ion complexes. The thermal acid generator for use in the present invention may also be selected from commercial products available typically under the trade name SI-180L (from SANSHIN CHEMICAL INDUSTRY CO., LTD.).

The adhesive may contain the thermal acid generator in a proportion (blending amount) of typically about 0.01 to about 5 parts by weight, preferably 0.05 to 3 parts by weight, and particularly preferably 0.1 to 2 parts by weight, per 100 parts by weight of the total amount of polymerizable compounds.

The adhesive may contain the thermal acid generator in an amount (blending amount) of typically about 0.01 to about 5 parts by weight, preferably 0.05 to 3 parts by weight, and particularly preferably 0.1 to 2 parts by weight, per 100 parts by weight of the total amount of the compound (A), the compound (B), and the compound (C).

The photoacid generators are compounds that generate, upon light irradiation, a sulfonic acid (e.g., a perfluoroalkylsulfonic acid or perfluorophosphonium sulfonic acid), a sulfonium cation, or any other substance. Non-limiting examples of the photoacid generators include iodonium salt compounds, of which aryliodonium salt compounds are preferred, and bisaryliodonium salt compounds are more preferred; and sulfonium salt compounds, of which arylsulfonium salt compounds are preferred, and triarylsulfonium salt compounds are more preferred. Each of them may be used alone or in combination.

Non-limiting examples of the cationic moiety in the photoacid generator include iodonium ions and sulfonium ions.

Examples of the iodonium ions include, but are not limited to, aryliodonium ions such as diphenyliodonium ion, di-p-tolyliodonium ion, bis(4-dodecylphenyl)iodonium ion, bis(4-methoxyphenyl)iodonium ion, (4-octyloxyphenyl)phenyliodonium ion, bis(4-decyloxy)phenyliodonium ion, 4-(2-hydroxytetradecyloxyphenyl)phenyliodonium ion, 4-isopropylphenyl(p-tolyl)iodonium ion, and 4-isobutylphenyl(p-tolyl)iodonium ion, of which bisaryliodonium ions are typified.

Examples of the sulfonium ions include, but are not limited to, arylsulfonium ions such as triphenylsulfonium ion, diphenyl[4-(phenylthio)phenyl]sulfonium ion, and tri-p-tolylsulfonium ion, of which triarylsulfonium ions are typified.

Non-limiting examples of the anionic moiety in the photoacid generator include perfluoroalkanesulfonium ions, perfluorophosphonium sulfonium ions, perfluoroantimonium sulfonium ions, $BF_4^-$, $B(C_6F_5)_4^-$, $PF_6^-$, $[(Rf)_nPF_{6-n}]^-$ (where Rf represents a group corresponding to an alkyl group, except for replacing 80% or more of hydrogen atoms with fluorine atoms, and n represents an integer of 1 to 5), $AsF_6^-$, $SbF_6^-$, and pentafluorohydroxyantimonate. Among them, perfluoroalkanesulfonium ions and perfluorophosphonium sulfonium ions are preferred in the present invention, because these anions are devoid of antimony, which is a toxic substance, and are safely usable.

The adhesive may contain the photoacid generator in an proportion (blending amount) of typically about 0.01 to about 5 parts by weight, preferably 0.05 to 3 parts by weight, and particularly preferably 0.1 to 2 parts by weight, per 100 parts by weight of the total amount of polymerizable compounds.

The adhesive may contain the photoacid generator in a proportion (blending amount) of typically about 0.01 to about 5 parts by weight, preferably 0.05 to 3 parts by weight, and particularly preferably 0.1 to 2 parts by weight, per 100 parts by weight of the total amount of the compound (A), the compound (B), and the compound (C).

Other Components

The adhesive according to the present invention may further contain a polymerization promoter. Non-limiting examples of the polymerization promoter include monovalent carboxylic acids represented by Formula (d) and monohydric alcohols represented by Formula (e). The adhesive may contain each of them alone or in combination. Advantageously, as compared with an adhesive devoid of polymerization promoters, the adhesive further containing any of the compounds (polymerization promoters) undergoes an accelerated polymerization reaction among the compound (A), the compound (B), and the compound (C) and forms, via polymerization even at a lower heating temperature, a polymer that has an equivalent or still higher softening point or melting point and maintains adhesiveness even in an environment at a higher temperature (e.g., about 160° C. to about 180° C.). Formulae (d) and (e) are expressed as follows:

$$Z_4\text{—COOH} \tag{d}$$

where $Z_4$ represents a group corresponding to a compound selected from the group consisting of saturated or unsaturated aliphatic hydrocarbons, saturated or unsaturated alicyclic hydrocarbons, and aromatic hydrocarbons, each of which may have one or more substituents excluding carboxy groups, except for removing one hydrogen atom from the structural formula of the corresponding compound,

$$Z_5\text{—OH} \tag{e}$$

where $Z_5$ represents a group corresponding to an aromatic hydrocarbon which may have one or more substituents excluding hydroxy groups, except for removing one hydrogen atom from the structural formula of the aromatic hydrocarbon.

The saturated or unsaturated aliphatic hydrocarbons, saturated or unsaturated alicyclic hydrocarbons, and aromatic hydrocarbons as $Z_4$ in Formula (d), and the aromatic hydrocarbon as $Z_5$ in Formula (e) are exemplified by, but not limited to, monovalent groups corresponding to the examples as $Z_3$. Non-limiting examples of the substituents which $Z_4$ may have include the examples, excluding carboxy group, of the substituents which $Z_3$ may have. Non-limiting examples of the substituents which $Z_5$ may have include the examples, excluding hydroxy group, of the substituents which $Z_3$ may have.

The polymerization promoter for use in the present invention has a pKa (acid dissociation constant) of preferably 3 to 8, and particularly preferably 4 to 6. The polymerization promoter, if having a pKa less than the range, tends to cause the adhesive to undergo polymerization progress to thereby have an increased viscosity. Typically because of this, the adhesive tends to have lower storage stability. In contrast, the polymerization promoter, if having a pKa greater than the range, tends to less effectively promote polymerization.

Preferred, but non-limiting examples of the monovalent carboxylic acids represented by Formula (d) include compounds as follows (including geometric isomers):

[Chem. 11]

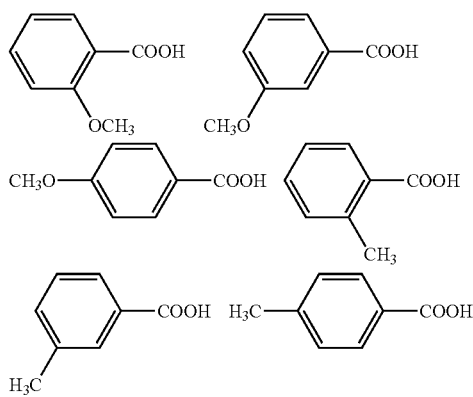

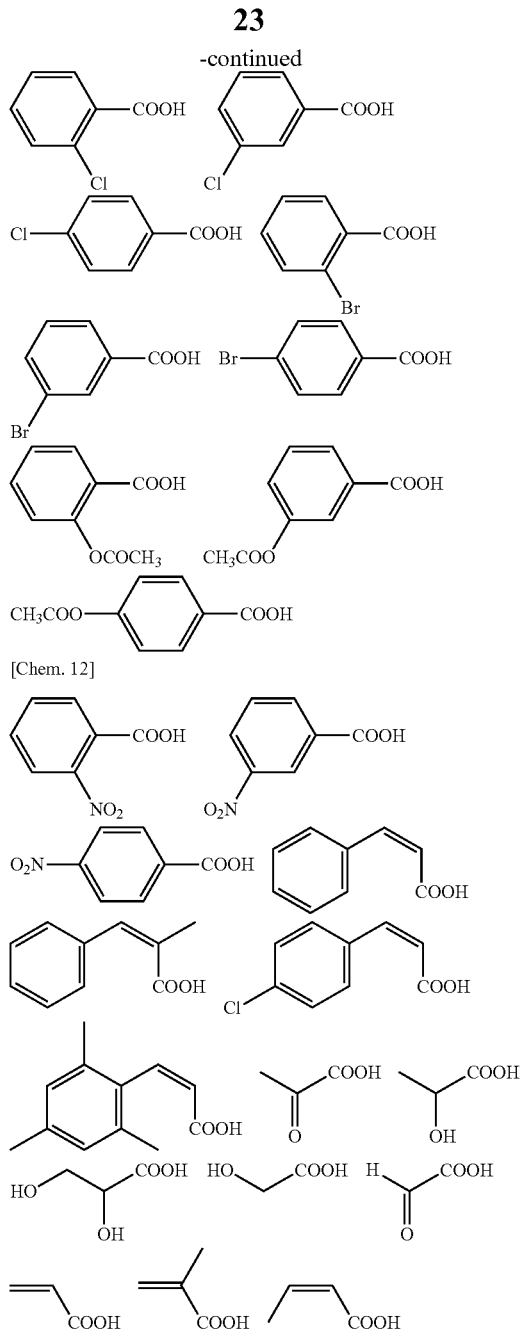

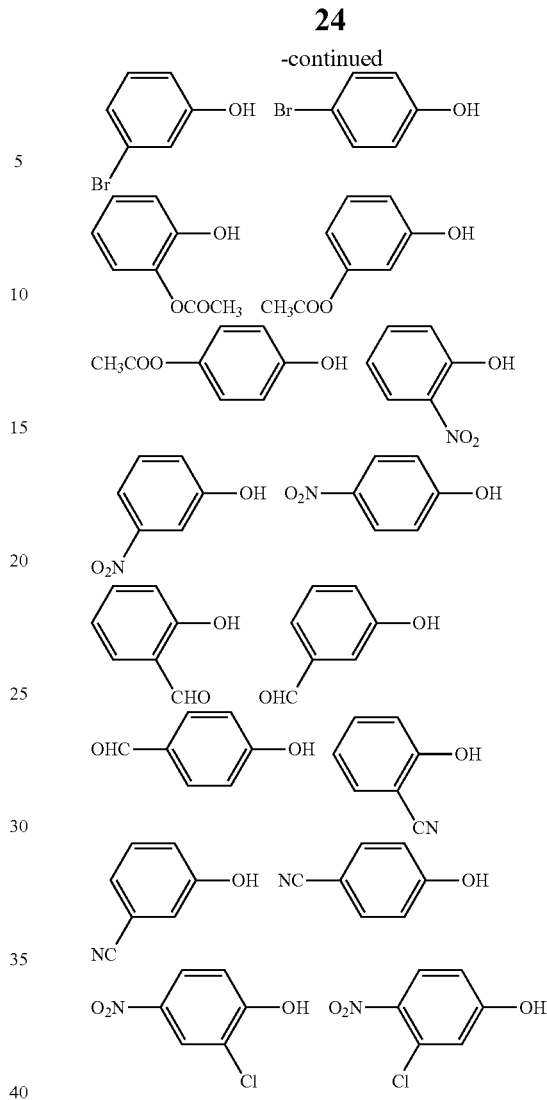

Preferred, but non-limiting examples of the monohydric alcohols represented by Formula (e) include compounds as follows:

[Chem. 13]

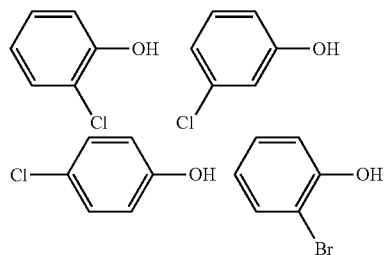

The adhesive may contain the polymerization promoter in a proportion of typically about 0.1 to about 10 parts by weight, and preferably 0.3 to 5 parts by weight, per 100 parts by weight of polymerizable compounds contained in the adhesive.

The adhesive according to the present invention may further contain one or more other components as needed. Examples of the other components include, but are not limited to, solvents, surfactants, leveling agents, silane coupling agents, and blowing agents. The adhesive may contain each of them alone or in combination.

The adhesive according to the present invention preferably contains a solvent. This is preferred because the viscosity of the adhesive is controllable by adjusting the amount of the solvent. Non-limiting examples of the solvent include toluene, hexane, isopropanol, methyl isobutyl ketone, cyclopentanone, propylene glycol monomethyl ether acetate, cyclohexanone, propylene glycol monomethyl ether, γ-butyrolactone, and any other conventionally known solvents. The adhesive may contain each of these solvents alone or in combination.

The adhesive according to the present invention preferably contains a surfactant in a content of about 0.01% to about 1% by weight based on the total amount of the adhesive. This is preferred because the adhesive less suffers from crawling upon coating and gives a coating layer with better uniformity. Non-limiting examples of the surfactant include products available under the trade names F-444, F-447, F-554, F-556, and F-557 (fluorine-containing oligomers, each from DIC Corporation); the trade name BYK-350 (an acrylic polymer, from BYG-Chemie GmbH); and the trade names A-1420, A-1620, and A-1630 (fluorine-containing alcohols, each from Daikin Industries Ltd.). The adhesive may contain each of different surfactants alone or in combination.

In an embodiment, the adhesive according to the present invention contains monomers such as the compound (A) and the compound (B), but is approximately devoid of resins such as the compound (C). This configuration reduces product-to-product variations in viscosity and allows production of adhesives with good reproducibility, where the adhesives have viscosities always falling within a certain range.

In another embodiment, the adhesive according to the present invention contains the compound (A), the compound (B), and the compound (C). The adhesive according to this embodiment gives a polymer that has a higher softening point or melting point and satisfactorily maintains adhesiveness even in an environment at a higher temperature, as compared with the adhesive devoid of the compound (C) according to the above-mentioned embodiment of the present invention.

In an embodiment, the adhesive according to the present invention contains an acid generator. The adhesive according to this embodiment gives a polymer that softens or liquefies to lose part or all of the adhesiveness by a heat treatment at a lower temperature, and adhesive residue deposited on the adherend after removal can be more easily removed, as compared with an adhesive devoid of acid generators according to another embodiment of the present invention.

The adhesive according to the present invention may be prepared by formulating the components and, as needed, other optional components, and stirring and mixing the components, as needed with debubbling in a vacuum. The stirring and mixing is preferably performed at a temperature of about 10° C. to about 80° C. The stirring and mixing may be performed using a known or common apparatus. Non-limiting examples of the apparatus include planetary centrifugal mixers, single-screw or multi-screw extruders, planetary mixers, kneaders, and dissolvers.

The adhesive according to the present invention has a viscosity of typically about 50 to about 600 mPa·s, and preferably 60 to 400 mPa·s at 25° C. The adhesive having tis configuration has excellent coatability and can be uniformly applied to the adherend surface.

Assume that the adhesive according to the present invention is applied to the adherend and then subjected to a heat treatment. This forms acetal bonding of the vinyl ether groups in the multivalent vinyl ether compound with hydroxy groups and/or carboxy groups and gives a polymer that has excellent adhesiveness.

For example, assume that the adhesive contains a compound represented by Formula (a-1) as the multivalent vinyl ether compound, a compound represented by Formula (b-5) as the compound (B), and a compound represented by Formula (c-1) as the compound (C). This adhesive, when subjected to a heat treatment, gives a polymer represented by Formula (1). Formulae (a-1), (b-5), (c-1), and (1) are expressed as follows:

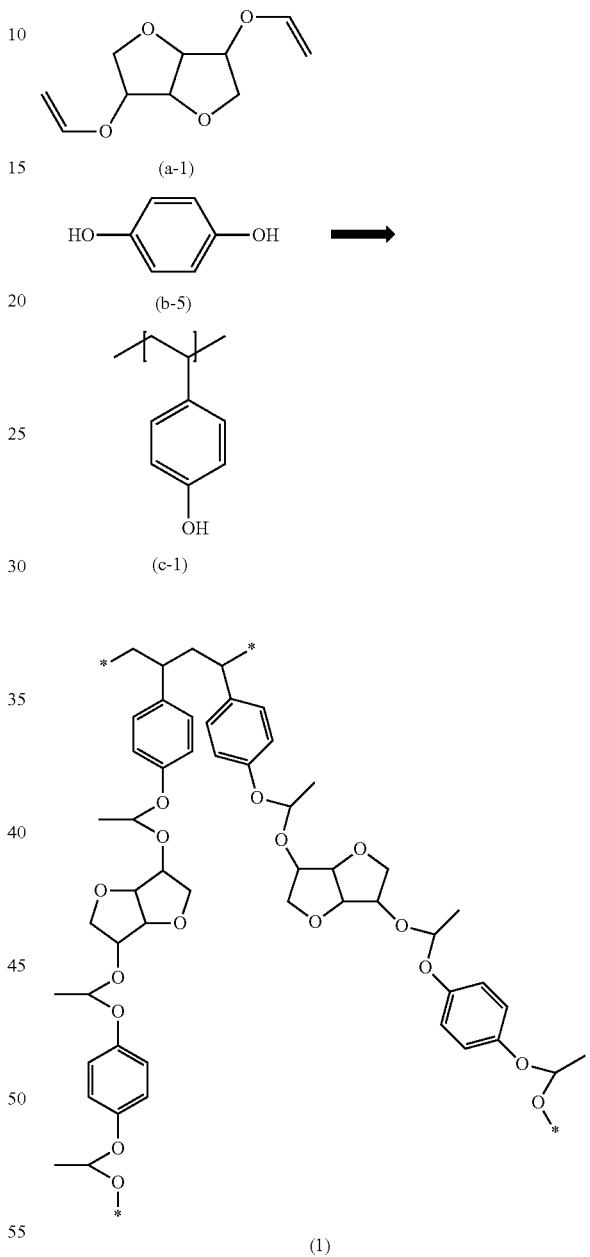

Assume that the adhesive contains the compound represented by Formula (a-1) as the multivalent vinyl ether compound; and a compound represented by Formula (b-2) and a compound represented by Formula (b-4) both as the compound (B). This adhesive, when subjected to a heat treatment, gives a polymer represented by Formula (2). Formulae (a-1), (b-2), (b-4), and (2) are expressed as follows:

[Chem. 15]

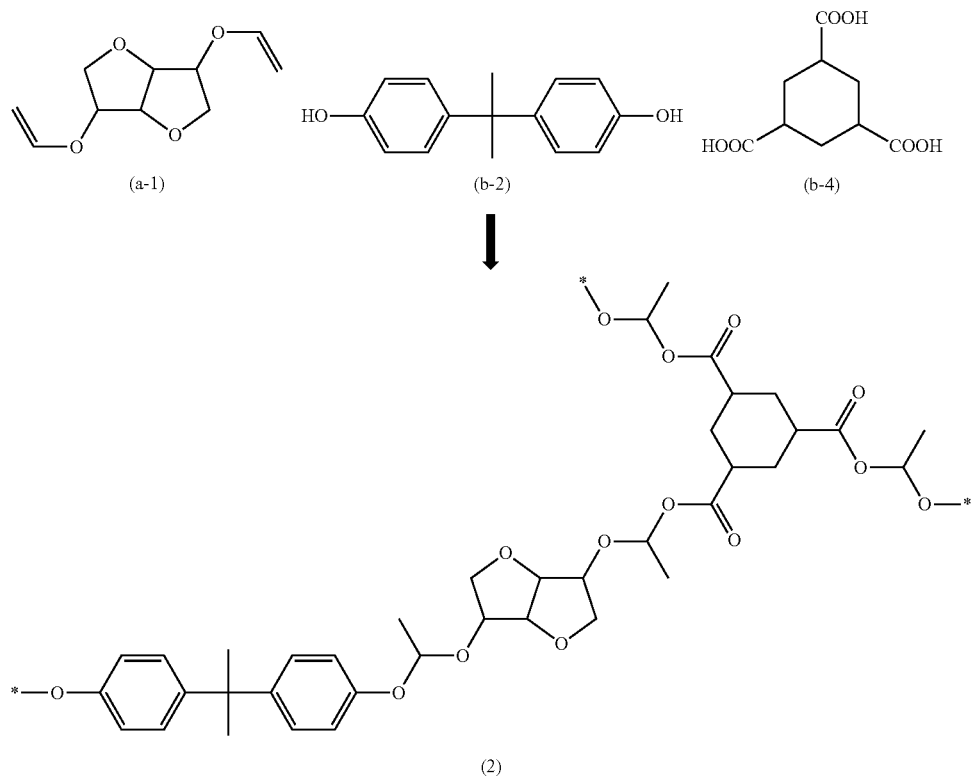

The polymer obtained by subjecting the adhesive according to the present invention to a heat treatment is a thermoplastic resin having a softening point or melting point of 160° C. or higher (typically 160° C. to 250° C., and preferably 170° C. to 200° C.) The polymer satisfactorily maintains adhesiveness even in a high-temperature environment (lower than 160° C.). As used herein the "softening point or melting point of the polymer" refers to a temperature as determined in the following manner. Initially, 0.1 g of the adhesive according to the present invention is applied to a thickness of 10 μm to a glass plate (1). The applied adhesive is placed on another glass plate (2) and subjected to a heat treatment at 180° C. to 235° C. for 4 minutes to give a laminate. The laminate includes the glass plate (1), a polymer derived from the adhesive, and the glass plate (2) disposed in this order. In the laminate, the glass plate (1) is horizontally pulled at a stress of 2 kg while the glass plate (2) is secured. During this process, the temperature at which the glass plate (1) begins moving is defined as the softening point or melting point of the polymer.

The polymer, when heated at a temperature equal to or higher than the softening point or melting point, softens or liquefies to immediately lose part or all of adhesiveness. The heating temperature is typically 160° C. or higher, preferably 180° C. to 300° C., and particularly preferably 200° C. to 250° C.

In an embodiment, the adhesive according to the present invention contains the acid generator. When heat or light is applied to the resulting polymer derived from the adhesive after polymerization to allow the acid generator to generate an acid, the polymer is decomposed into compound (i.e., decomposed products) having lower molecular weights and having lower softening points or melting points, as compared with the polymer before decomposition. The decomposed products soften or liquefy to immediately lose part or all of adhesiveness by heating at a temperature lower than the softening point or melting point of the polymer before decomposition. The heating temperature herein is typically about 50° C. to about 150° C.

The polymer or the decomposed products of the polymer soften or liquefy by heating at a temperature equal to or higher than the softening point or melting point of the polymer or the decomposed products. The softened or liquefied compound has good solubility in one or more of solvents such as cyclohexanone, propylene glycol monomethyl ether, propylene glycol monomethyl ether acetate, acetone, ethyl acetate, butyl acetate, and methyl isobutyl ketone. An adhesive residue derived from the adhesive, when deposited on the adherend after removal, can be easily washed away using one or more of the solvents.

The adhesive according to the present invention have the properties and, when subjected to a heat treatment, forms a polymer that satisfactorily maintains adhesiveness. The polymer firmly holds the adherend even in a high-temperature environment. Once the holding (bonding) becomes unnecessary, the polymer is subjected to a heat treatment, or to light irradiation and the heat treatment, to soften or liquefy. This makes the adherend easily removable without adhesive residue. Thus, the adhesive according to the present invention is advantageously usable as an adhesive for temporarily securing a fragile adherend.

Method for Temporarily Securing Adherend

The method according to the present invention for temporarily securing an adherend uses an adhesive to temporarily secure the adherend to a support. The method includes a securing step and a removing step. In the securing step, the adhesive according to the present invention is subjected to a heat treatment to give a polymer derived from the multivalent vinyl ether compound (A) and at least one of the compound (B) represented by Formula (b) and the compound (C) including two or more constitutional units each represented by Formula (c). The adherend is secured to the support via the polymer. In the removing step, the polymer is subjected to a heat treatment, or to light irradiation and the heat treatment, to soften or liquefy. The adherend is thereby removed from the support.

The method according to the present invention for temporarily securing an adherend employs the adhesive. With the method, the adherend, even when being a fragile adherend, can be bonded and secured to the support so as to be protected, and the adherend can be continuously secured even in a high-temperature environment. Once the protection becomes unnecessary, the adherend can be removed from the support without failure (breakage) and without adhesive residue. Non-limiting examples of the fragile adherend include silicon wafers, optical glass, films, metal sheets, and ceramic sheets.

Non-limiting examples of embodiments to perform the securing step include embodiments 1 to 3 as follows.

In the embodiment 1, the adherend is applied to the support using the adhesive, and the adhesive in this state is heated to be polymerized and to give a polymer. The adherend is thus secured to the support via the polymer.

In the embodiment 2, the adhesive is applied to the surface of at least one of the adherend and the support and heated to be polymerized. The polymerized adhesive (polymer) on the surface of one of the adherend and the support is applied to the other one and is then softened to secure the adherend to the support.

In the embodiment 3, the adhesive is applied onto a base other than the adherend and the support, heated to be polymerized, and forms an adhesive sheet. The adhesive sheet is sandwiched between the adherend and the support and then softened to secure the adherend to the support.

In the embodiments 1 to 3, the adhesive is polymerized by heating, namely, the adhesive is polymerized to give a polymer derived from the compound (A) and at least one compound selected from the compound (B) and the compound (C). The heating upon polymerization is performed at a temperature of typically about 100° C. to about 300° C., and preferably 100° C. to 250° C. The heating may be performed at a constant temperature or at stepwise-varying temperatures. The heating may be performed for a time (duration) of typically about 30 seconds to about 30 minutes, and preferably 3 minutes to 12 minutes. The heating, if performed at a temperature lower than the range and/or performed for a time shorter than the range, causes the resulting polymer to have a lower weight-average molecular weight and to have a lower softening point or melting point. This polymer tends to less satisfactorily maintain adhesiveness in a high-temperature environment. In contrast, the heating, if performed at a temperature higher than the range and/or if performed for a time longer than the range, may cause side reactions and thereby cause the resulting polymer to have a lower softening point or melting point. The heating may lead to curing more than necessary and cause the resulting polymer to have an excessively high softening point or melting point. This polymer derived from the adhesive may be less satisfactorily washed away after removal of the adherend. Disadvantageously, this results in lower productivity.

In the embodiments 2 and 3, the polymerized adhesive or the adhesive sheet may be softened typically by heating the polymerized adhesive or the adhesive sheet at a temperature of typically 170° C. to 250° C., and preferably 190° C. to 230° C. for a time of typically about 0.5 to about 10 minutes, and preferably 1 to 5 minutes.

The polymer is preferably cooled down to a temperature lower than the softening point or melting point of the polymer, after the polymerization in the embodiment 1; after the softening of the polymerized adhesive in the embodiment 2; and after the softening of the adhesive sheet in the embodiment 3. This is preferred because the cooling makes the once softened polymer hard so as to firmly secure the adherend to the support.

The application (affixation) of the adherend and the support to each other in the embodiments 1 to 3 is preferably performed by conducting a heat treatment while compressing them at an appropriate pressure (e.g., about 300 to about 5000 g/cm$^2$). This is preferred for more firmly bonding and securing the adherend to the support.

The securing step may be performed in the atmosphere (in the air) or in a vacuum.

In particular, the securing step in the method according to the present invention for temporarily securing an adherend is preferably the securing step according to the embodiment 2. Specifically, the method according to the present invention for temporarily securing an adherend is preferably a method for temporarily securing an adherend to a support using an adhesive, where the method includes a securing step and a removing step as follows. In the securing step, the adhesive is applied onto at least one of the adherend and the support, is then subjected to a heat treatment to form a polymer derived from the multivalent vinyl ether compound (A) and at least one of the compound (B) represented by Formula (b) and the compound (C) including two or more constitutional units each represented by Formula (c). The adherend is thus secured to the support via the polymer. In the removing step, the polymer is subjected to a heat treatment, or to light irradiation and the heat treatment, to soften or liquefy. The adherend is thereby removed from the support.

In the removing step, the polymer is softened or liquefied by heating. The heating temperature herein has only to be a temperature equal to or higher than the softening point or melting point of the polymer and is typically about 165° C. to about 250° C., and preferably 170° C. to 220° C. The heating may be performed for a time of typically about 30 seconds to about 15 minutes, and preferably 3 minutes to 5 minutes. As used herein the term "soften or liquefy" refers to that the viscosity of the polymer is reduced down to 100 Pa·s or less (and preferably 1 Pa·s or less).

Assume that the adhesive according to the present invention contains the acid generator. In this case, the method may further include the step of previously decomposing the polymer by an acid to give decomposed products having lower molecular weights. This configuration allows the adherend to be removed at a temperature lower than the softening point or melting point of the polymer. In an embodiment, the adhesive contains a photoacid generator as the acid generator. In particular in this embodiment, the heating may be performed at a temperature of typically about 50° C. to about 160° C., and preferably 100° C. to 150° C., for a time of typically about 30 seconds to about 30 minutes, and preferably 3 minutes to 5 minutes. In another embodiment, the adhesive contains a thermal acid generator as the acid generator. In this embodiment, the heating may be performed at a temperature of typically about 200° C. to about 300° C., and preferably 210° C. to 270° C., for a time of typically about 30 seconds to about 30 minutes, and preferably 5 minutes to 20 minutes.

When the adhesive contains the photoacid generator as the acid generator, the securing step in the method preferably further includes the substep of performing light irradiation before the heat treatment. This allows the adherend to be removable at a still lower temperature. Non-limiting examples of the light include luminous rays of various wavelengths, such as ultraviolet rays and X rays. A light source for use herein preferably emits far-ultraviolet light at a wavelength of 400 nm or less. The light may be applied at an irradiation energy of typically about 500 to about 8000 mJ/cm$^2$.

Exemplary techniques for applying the adhesive include known or common techniques such as curtain coating, squeegee coating, roll coating, spray coating, brush coating, bar coating, roller coating, silk-screen printing, and spin coating.

The thickness of the applied layer of the adhesive can be adjusted as appropriate according to the intended use. For example, the adhesive, when used to bond a semiconductor wafer to a support, may be applied to a thickness of about 1 to about 20 μm.

The method according to the present invention for temporarily securing an adherend preferably further includes the step of washing the adherend after the removing step, when an adhesive residue remains on the adherend surface after removing. The washing clears the adhesive residue from the adherend. Assume that the adherend is temporarily secured using the adhesive containing the acid generator. In particular in this case, the polymer derived from the adhesive can be decomposed into decomposed products having lower molecular weights in the removing step. The adhesive residue in this case can be very easily washed away.

Adhesive Film

The adhesive film according to the present invention is obtained by applying the adhesive and subjecting the applied adhesive to a heat treatment. The adhesive film includes a polymer derived from the multivalent vinyl ether compound (A) and at least one of the compound (B) represented by Formula (b) and the compound (C) including two or more constitutional units each represented by Formula (c).

An article to which the adhesive is applied is not limited and is exemplified by the adherend and the support. The coating agent (adhesive) may be applied by a procedure similar to the application of the adhesive in the method for temporarily securing an adherend. Likewise, the heat treatment may be performed by a procedure similar to the polymerization of the adhesive in the method for temporarily securing an adherend.

The thickness of the adhesive film can be adjusted as appropriate according to the intended use. For example, the adhesive film, when used for bonding a semiconductor wafer to the support, may have a thickness of about 1 to about 20 μm.

Method for Processing Adherend

The method according to the present invention for processing an adherend processes the adherend, where the adherend is temporarily secured using an adhesive. The method includes a securing step, a processing step, and a removing step. In the securing step, the adhesive according to the present invention is subjected to a heat treatment to give a polymer derived from the multivalent vinyl ether compound (A) and at least one of the compound (B) represented by Formula (b) and the compound (C) including two or more constitutional units each represented by Formula (c). The adherend is secured to the support via the polymer. In the processing step, the secured adherend is processed. In the removing step, the polymer is subjected to a heat treatment, or to light irradiation and the heat treatment, to soften or liquefy. The adherend after the processing is thereby removed from the support.

The securing step and the removing step may be performed by procedures as in the method for temporarily securing an adherend. The method for processing an adherend also preferably further includes the step of washing after the removing step, when an adhesive residue remains on the adherend surface after removing.

The processing step is the step of processing the adherend. For example, when adherend is a silicon wafer, the processing step subjects the adherend typically to grinding (thinning) and/or etching. According to the present invention, the adherend is processed while being secured to the support using the adhesive. This protects the adherend from failure in the working step (processing step) and in a downstream transportation step even when the adherend is ground very thin. The adhesive according to the present invention forms a polymer having a high softening point or melting point of 160° C. or higher. The polymer resists softening or liquefaction, can continuously hold and secure the adherend to the support, and can eliminate or minimize the adherend failure even in a high-temperature environment (lower than 160° C.)

EXAMPLES

The present invention will be illustrated in further detail with reference to several examples below. It should be noted, however, that the examples are by no means intended to limit the scope of the present invention.

Spin coating of a sample adhesive was performed using a spin coater (trade name ACT-400AII, supplied by ACTIVE Co., Ltd.).

Heating was performed using a hot plate (ND-1, supplied by AS ONE Corporation).

Ultraviolet irradiation was performed using the SPOT-CURE (UIS-25102, supplied by Ushio Inc.).

Production Example 1

In 30 g of cyclohexanone (supplied by Wako Pure Chemical Industries, Ltd.), 18 g of dicyclopentanyl acrylate (supplied by Hitachi Chemical Company, Ltd.) and 2 g of methacrylic acid (supplied by Wako Pure Chemical Industries, Ltd.) were dissolved to give a solution. The solution was further combined with 0.4 g of dimethyl 2,2'-azobis(2-methyl propionate) (trade name V-601, supplied by Wako Pure Chemical Industries, Ltd.), followed by polymerization at 80° C. for 6 hours, and yielded a composition including a copolymer and cyclohexanone. The copolymer was a 90:10 (by weight) copolymer of dicyclopentanyl acrylate and methacrylic acid and had a weight-average molecular weight of 20000 as determined by GPC and calibrated with a polystyrene standard.

Example 1

Adhesive Preparation

In 66.7 g of propylene glycol monomethyl ether, 39.8 g of 1,1,1-tris(4-hydroxyphenyl)ethane (supplied by Wako Pure Chemical Industries, Ltd.) and 8.6 g of glutaric acid (supplied by Wako Pure Chemical Industries, Ltd.) were dissolved to give a solution. The solution was combined with 51.6 g of isosorbide divinyl ether (supplied by Daicel Corporation) and yielded an adhesive. This had a viscosity of 70 mPa·s at 25° C.

Adhesive Film Preparation

The prepared adhesive was applied to a glass plate (supplied by Matsunami Glass Ind., Ltd., 7.6 cm by 2.6 cm by 0.2 cm) by spin coating at 1200 rpm for 10 seconds, heated at 100° C. for 2 minutes, further heated at 150° C. for 2 minutes, and still further heated at 200° C. for 4 minutes to form an adhesive film having a thickness of 10 μm. This gave a laminate including the adhesive film and the glass plate.

Examples 2 to 39

Adhesive Preparation

Adhesives were prepared by a procedure similar to Example 1, except for blending components in formulations (in part by weight) given in tables below.

Adhesive Film Preparation: Examples 2 to 24 and 28 to 30

Adhesive films having a thickness of 10 μm were prepared using the prepared adhesives, and laminates including the adhesive film and the glass plate were prepared by procedures similar to Example 1.

Adhesive Film Preparation: Examples 25 to 27

The prepared adhesives were each applied to a glass plate (supplied by Matsunami Glass Ind., Ltd., 7.6 cm by 2.6 cm by 0.2 cm) by spin coating at 1200 rpm for 10 seconds, heated at 140° C. for 2 minutes, further heated at 180° C. for 2 minutes to form adhesive films having a thickness of 10 μm, and yielded laminates including the adhesive film and the glass plate.

Adhesive Film Preparation: Examples 31 to 39

The prepared adhesives were each applied to a glass plate (supplied by Matsunami Glass Ind., Ltd., 7.6 cm by 2.6 cm by 0.2 cm) by spin coating at 1200 rpm for 10 seconds, heated at 140° C. for 2 minutes, further heated at 200° C. for 2 minutes, still further heated at 235° C. for 4 minutes to form adhesive films each having a thickness of 10 μm, and yielded laminates including the adhesive film and the glass plate.

Comparative Example 1

Adhesive Preparation

In 30 g of cyclohexanone (supplied by Wako Pure Chemical Industries, Ltd.), 18 g of dicyclopentanyl methacrylate (supplied by Hitachi Chemical Company, Ltd.) and 2 g of methacrylic acid (supplied by Wako Pure Chemical Industries, Ltd.) were dissolved to give a solution. The solution was combined with 0.4 g of dimethyl 2,2'-azobis(2-methyl propionate) (trade name V-601, supplied by Wako Pure Chemical Industries, Ltd.), followed by polymerization at 80° C. for 6 hours, and yielded an adhesive containing a resin. The resin obtained by polymerization had a weight-average molecular weight of 30000 as determined by GPC and calibrated with a polystyrene standard.

Adhesive Film Preparation

The prepared adhesive was applied to a glass plate (supplied by Matsunami Glass Ind., Ltd., 7.6 cm by 2.6 cm by 0.2 cm) by spin coating at 1200 rpm for 10 seconds, heated at 160° C. for 5 minutes to form an adhesive film having a thickness of 10 μm and yielded a laminate including the adhesive film and the glass plate.

Comparative Example 2

Adhesive Film Preparation

Except for using the composition prepared in Production Example 1 as an adhesive, a laminate including the adhesive film and a glass plate was prepared by a procedure similar to Comparative Example 1.

The adhesive films prepared in the examples and comparative examples were evaluated by methods as follows. Results are given in the tables.

Evaluation Methods

1. Adhesive Film Evaluation

The adhesive film in each of the laminates including the adhesive film and the glass plate prepared in the examples and comparative examples was visually observed and evaluated corresponding to criteria as follows:

Criteria

Very good (VG): the adhesive film surface was approximately devoid of asperities and devoid of portions from which the glass surface was exposed;

Good: the adhesive film surface had asperities, but was devoid of portions from which the glass surface was exposed;

Poor: the adhesive film surface had asperities and had portions from which the glass surface was exposed.

2. Applicability

The adhesive film of each of the laminates including the adhesive film and the glass plate prepared in the examples and comparative examples was placed on a glass plate (supplied by Matsunami Glass Ind., Ltd., 7.6 cm by 2.6 cm by 0.2 cm) with compression at a pressure of 800 g/cm$^2$ for one minute so as to have an adhesion area of 6.76 cm$^2$ (2.6 cm by 2.6 cm), while heating the adhesive film at 200° C. This gave a laminate including the glass plate, the adhesive film, and the glass plate disposed in this order. The adhesive face of the resulting laminate was observed and evaluated according to criteria as follows:

Criteria

Good: the adhesive face was devoid of residual bubbles and was uniform; and

Poor: the adhesive face included residual bubbles, or bonding was failed.

3. Adhesiveness

The laminates that successfully underwent bonding in the applicability evaluation were cooled down to room temperature and evaluated according to criteria as follows, where the laminates included the glass plate, the adhesive film, and the glass plate disposed in this order.

Criteria

Good: the adhesive face underwent approximately no change, and the laminate did not undergo spontaneous delamination;

Fair: the adhesive face underwent cracking, but the laminate did not undergo spontaneous delamination; and Poor: the laminate underwent spontaneous delamination.

4. Adhesiveness Retention

Each of the laminates prepared in the applicability evaluation, where the laminates included the glass plate, the adhesive film, and the glass plate disposed in this order, was heated, and while one of the glass plates was secured, the other glass plate was pulled at a load of 2 kg horizontally with respect to the laminate plane. The temperature at which the pulled glass plate was moved was defined as the softening point or melting point. Based on this, adhesiveness retention in a high-temperature environment was evaluated. For the laminates that were prepared using the adhesives prepared in the comparative examples and included the glass plate, the adhesive film, and the glass plate disposed in this order, the laminates were formed at 200° C. and, without being cooled down to room temperature, were subjected as intact to the determination of the softening point or melting point by the above method.

Criteria

Very good (VG): the sample had a softening point or melting point of 180° C. or higher;

Good: the sample had a softening point or melting point of from 160° C. to lower than 180° C.;

Fair: the sample had a softening point or melting point of from 100° C. to lower than 160° C.; and Poor: the sample had a softening point or melting point of lower than 100° C.

5. Removability

Each of the laminates prepared in the applicability evaluation, where the laminates included the glass plate, the adhesive film, and the glass plate disposed in this order, was heated, and while one of the glass plates was secured, the other glass plate was slid and removed at a load of 2 kg. The release surface was observed, and, based on this, removability was evaluated according to criteria below. Among the adhesive films, the adhesive films prepared using the adhesives containing an acid generator were irradiated with an ultraviolet ray with a wavelength of 360 nm at 4000 mJ/cm$^2$ before heating.

Criteria

Very good (VG): the adhesive film softened or liquefied, and the glass plate was removed by heating at 150° C. for 2 minutes; and Good: the glass plate was removed via cohesive failure of the adhesive film upon heating at 150° C. for 2 minutes; but the adhesive film softened or liquefied, and the glass plate was removed upon heating at 235° C. for 10 minutes.

6. Washability

Each of the glass plates removed in the removability evaluation was immersed in one of cyclohexanone, propylene glycol monomethyl ether, and a 0.1 M sodium hydroxide aqueous solution, at 25° C. for one minute. Whether the adhesive film remained on the glass plate was visually observed, based on which washability was evaluated according to criteria as follows:

Criteria

Very good (VG): the adhesive film was fully eliminated using, as the solvent, any one of cyclohexanone, propylene glycol monomethyl ether, and the 0.1 M sodium hydroxide aqueous solution;

Good: the adhesive film failed to be fully eliminated using, as the solvent, the 0.1 M sodium hydroxide aqueous solution, but was fully eliminated using either of cyclohexanone and propylene glycol monomethyl ether;

Fair: the adhesive film was fully eliminated using only one of cyclohexanone and propylene glycol monomethyl ether; and Poor: the adhesive film failed to be fully eliminated using any of the solvents.

TABLE 1

| | | Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Compound (A) | a-1 | 51.6 | | | 54.6 | | | 40 | | | 40 | | |
| | a-2 | | 51.4 | | | 54.3 | | | 46.1 | | | 46.1 | |
| | a-3 | | | 47.5 | | | 50.5 | | | 39.5 | | | 39.5 |
| Compound (B) | b-1 | 39.8 | 40 | 43.2 | | | | | | | | | |
| | b-2 | | | | 15.7 | 15.8 | 17.1 | | | | | | |
| | b-3 | 8.6 | 8.6 | 9.3 | | | | | | | | | |
| | b-4 | | | | 29.7 | 29.9 | 32.4 | | | | | | |
| | b-5 | | | | | | | 16.5 | 16.5 | 16.5 | 16.5 | 16.5 | 16.5 |
| Compound (C) | c-1 | | | | | | | 150 | 150 | 150 | 145 | 145 | 145 |
| | c-2 | | | | | | | | | | 5 | 5 | 5 |
| Polymerization promoter | d-1 | | | | | | | | | | | | |
| Surfactant | e-1 | | | | | | | | | | | | |
| Solvent | f-1 | 66.7 | 66.7 | 66.7 | | | | 195 | 195 | 195 | 195 | 195 | 195 |
| | f-2 | | | | 66.7 | 66.7 | 66.7 | | | | | | |
| Acid generator | | | | | | | | | | | | | |
| Evaluations | Adhesive face | Good | Good | Good | Good | Good | Good | Good | Good | Good | Good | Good | Good |
| | Applicability | Good | Good | Good | Good | Good | Good | Good | Good | Good | Good | Good | Good |
| | Adhesiveness | Good | Good | Good | Good | Good | Good | Good | Good | Good | Good | Good | Good |
| | Adhesiveness retention | Good | Good | Good | Good | Good | Good | Good | Good | Good | VG | VG | VG |
| | Removability | Good | Good | Good | Good | Good | Good | Good | Good | Good | Good | Good | Good |
| | Washability | Good | Good | Good | Good | Good | Good | Good | Good | Good | Good | Good | Good |

TABLE 2

| | | Examples | | | | | | | | | | | |
|---|---|---|---|---|---|---|---|---|---|---|---|---|---|
| | | 13 | 14 | 15 | 16 | 17 | 18 | 19 | 20 | 21 | 22 | 23 | 24 |
| Compound (A) | a-1 | 51.8 | | | 55.2 | | | 40 | | | 40 | | |
| | a-2 | | 51.5 | | | 54.9 | | | 46.1 | | | 46.1 | |
| | a-3 | | | 47.4 | | | 51.1 | | | 39.5 | | | 39.5 |

TABLE 2-continued

|  |  | Examples |  |  |  |  |  |  |  |  |  |  |  |
|---|---|---|---|---|---|---|---|---|---|---|---|---|---|
|  |  | 13 | 14 | 15 | 16 | 17 | 18 | 19 | 20 | 21 | 22 | 23 | 24 |
| Compound (B) | b-1 | 38.1 | 38.3 | 41.4 | 42.5 | 42.8 | 46.4 |  |  |  |  |  |  |
|  | b-2 | 1.5 | 1.5 | 1.6 |  |  |  |  |  |  |  |  |  |
|  | b-3 | 8.6 | 8.7 | 9.4 | 2.3 | 2.3 | 2.5 |  |  |  | 13.2 | 13.2 | 13.2 |
|  | b-4 |  |  |  |  |  |  |  |  |  |  |  |  |
|  | b-5 |  |  |  |  |  |  | 11 | 11 | 11 |  |  |  |
| Compound (C) | c-1 |  |  |  |  |  |  | 150 | 150 | 150 | 150 | 150 | 150 |
|  | c-2 |  |  |  |  |  |  |  |  |  |  |  |  |
| Polymerization promoter | d-1 |  |  |  |  |  |  |  |  |  |  |  |  |
| Surfactant | e-1 |  |  |  |  |  |  |  |  |  |  |  |  |
| Solvent | f-1 | 66.7 | 66.7 | 66.7 | 66.7 | 66.7 | 66.7 | 185 | 185 | 185 | 185 | 185 | 185 |
|  | f-2 |  |  |  |  |  |  |  |  |  |  |  |  |
| Acid generator |  | 1 | 1 | 1 | 1 | 1 | 1 | 2.01 | 2.07 | 2 | 2.03 | 2.09 | 2.03 |
| Evaluations | Adhesive face | Good | Good | Good | Good | Good | Good | Good | Good | Good | Good | Good | Good |
|  | Applicability | Good | Good | Good | Good | Good | Good | Good | Good | Good | Good | Good | Good |
|  | Adhesiveness | Good | Good | Good | Good | Good | Good | Good | Good | Good | Good | Good | Good |
|  | Adhesiveness retention | — | — | — | — | — | — | — | — | — | — | — | — |
|  | Removability | VG | VG | VG | VG | VG | VG | VG | VG | VG | VG | VG | VG |
|  | Washability | VG | VG | VG | VG | VG | VG | VG | VG | VG | VG | VG | VG |

TABLE 3

|  |  | Examples |  |  |  |  |  | Comparative Examples |  |
|---|---|---|---|---|---|---|---|---|---|
|  |  | 25 | 26 | 27 | 28 | 29 | 30 | 1 | 2 |
| Compound (A) | a-1 | 40 |  |  | 40 |  |  |  |  |
|  | a-2 |  | 46.1 |  |  | 46.1 |  |  |  |
|  | a-3 |  |  | 39.5 |  |  | 39.5 |  |  |
| Compound (B) | b-1 |  |  |  |  |  |  |  |  |
|  | b-2 |  |  |  |  |  |  |  |  |
|  | b-3 |  |  |  |  |  |  |  |  |
|  | b-4 |  |  |  |  |  |  |  |  |
|  | b-5 | 16.5 | 16.5 | 16.5 | 16.5 | 16.5 | 16.5 |  |  |
| Compound (C) | c-1 | 150 | 150 | 150 | 150 | 150 | 150 |  |  |
|  | c-2 |  |  |  |  |  |  |  |  |
| Polymerization promoter | d-1 | 1.5 | 1.5 | 1.5 |  |  |  |  |  |
| Surfactant | e-1 |  |  |  | 1.03 | 1.06 | 1.03 |  |  |
| Solvent | f-1 | 195 | 195 | 195 | 195 | 195 | 195 |  |  |
|  | f-2 |  |  |  |  |  |  |  |  |
| Acid generator |  |  |  |  |  |  |  |  |  |
| Evaluations | Adhesive face | Good | Good | Good | VG | VG | VG | Good | Good |
|  | Applicability | Good | Good | Good | Good | Good | Good | Good | Good |
|  | Adhesiveness | Good | Good | Good | Good | Good | Good | Poor | Fair |
|  | Adhesiveness retention | Good | Good | Good | Good | Good | Good | Fair | Poor |
|  | Removability | Good | Good | Good | Good | Good | Good | Good | Good |
|  | Washability | Good | Good | Good | Good | Good | Good | Fair | Fair |

TABLE 4

|  |  | Examples |  |  |  |  |  |  |  |  |
|---|---|---|---|---|---|---|---|---|---|---|
|  |  | 31 | 32 | 33 | 34 | 35 | 36 | 37 | 38 | 39 |
| Compound (A) | a-1 | 1.4 | 1.9 | 20.0 | 20.0 |  |  |  |  | 10.0 |
|  | a-2 |  |  |  |  |  |  |  |  |  |
|  | a-3 |  |  |  |  |  |  |  |  |  |
|  | a-4 |  |  |  | 5.0 |  |  |  |  |  |
|  | a-5 |  |  |  |  | 5.0 |  |  |  |  |
|  | a-6 |  |  |  |  |  | 5.0 |  |  |  |
|  | a-7 |  |  |  |  |  |  | 5.0 |  |  |

TABLE 4-continued

| | | Examples | | | | | | | | |
|---|---|---|---|---|---|---|---|---|---|---|
| | | 31 | 32 | 33 | 34 | 35 | 36 | 37 | 38 | 39 |
| Compound (B) | b-1 | | | | | | | | | |
| | b-2 | | | | | | | | | |
| | b-3 | | | | | | | | | |
| | b-4 | | | | | | | | | |
| | b-5 | 0.4 | 0.4 | 16.5 | 16.5 | 16.5 | 16.5 | 16.5 | 16.5 | 16.5 |
| Compound (C) | c-1 | | | | | 150.0 | 150.0 | 150.0 | 150.0 | 150.0 |
| | c-2 | | | | | | | | | |
| | c-3 | 150.0 | 150.0 | | | | | | | |
| | c-4 | | | 150.0 | 150.0 | | | | | |
| Polymerization promoter | d-1 | 0.1 | 0.1 | 3.0 | 3.0 | 3.0 | 3.0 | 3.0 | 3.0 | 3.0 |
| Surfactant | e-1 | | | | | | | | | |
| Solvent | f-1 | | | | | | | | | |
| | f-2 | 415.5 | 415.5 | | | | | | | |
| | f-3 | | | 205.3 | 205.5 | 186.3 | 186.3 | 186.3 | 186.3 | 186.3 |
| Acid generator | | | | | | | | | | |
| Evaluations | Adhesive face | Good | Good | Good | Good | Good | Good | Good | Good | Good |
| | Applicability | Good | Good | Good | Good | Good | Good | Good | Good | Good |
| | Adhesiveness | Good | Good | Good | Good | Good | Good | Good | Good | Good |
| | Adhesiveness retention | Good | VG | Good | Good | Good | Good | Good | Good | Good |
| | Removability | Good | Good | Good | Good | Good | Good | Good | Good | Good |
| | Washability | Good | Good | Good | Good | Good | Good | Good | Good | Good |

The abbreviations in the tables refer to compounds as follows.

Compound (A)
a-1: Isosorbide divinyl ether
a-2: 2-(or 3-)Vinyloxy-5-(vinyloxymethyl)-7-oxabicyclo[2.2.1]heptane
a-3: 1,4-Cyclohexanediol divinyl ether
a-4: 1,4-Cyclohexanedimethanol divinyl ether
a-5: 1,4-Butanediol divinyl ether
a-6: Diethylene glycol divinyl ether
a-7: Triethylene glycol divinyl ether Compound (B)
b-1: 1,1,1-Tris(4-hydroxyphenyl)ethane
b-2: 4,4'-(Propane-2,2'-diyl)diphenol
b-3: Glutaric acid
b-4: 1,3,5-Cyclohexanetricarboxylic acid
b-5: Hydroquinone Compound (C)
c-1: Poly-p-hydroxystyrene, having a weight-average molecular weight of 2000 as determined by GPC and calibrated with a polystyrene standard, trade name Marukalinker M S1P Grade supplied by Maruzen Petrochemical Co., Ltd.
c-2: Poly-p-hydroxystyrene, having a weight-average molecular weight of 5000 as determined by GPC and calibrated with a polystyrene standard, trade name Marukalinker M S2P Grade supplied by Maruzen Petrochemical Co., Ltd.
c-3: Dicyclopentanyl acrylate/methacrylic acid copolymer, prepared in Production Example 1
c-4: p-Hydroxystyrene/styrene copolymer (mole ratio: 50/50, weight ratio: 46/54), having a weight-average molecular weight of 4400 as determined by GPC and calibrated with a polystyrene standard, trade name Marukalinker CST-50 supplied by Maruzen Petrochemical Co., Ltd.

Polymerization Promoter
d-1: Trans-cinnamic acid (having a pKa of 4.44, supplied by Wako Pure Chemical Industries, Ltd.)

Surfactant
e-1: Fluorine-containing oligomer (trade name F-554, supplied by DIC Corporation Solvent
f-1: Propylene glycol monomethyl ether
f-2: Propylene glycol 1-monomethyl ether 2-acetate
f-3: Cyclohexanone Acid Generator
Triphenylsulfonium perfluoro-1-butanesulfonate, supplied by Aldrich

INDUSTRIAL APPLICABILITY

As long as securing of an adherend is necessary, the adhesive according to the present invention maintains high adhesiveness to bond and secure the adherend even in a high-temperature environment. Once the securing of the adherend becomes unnecessary, the adherend can be easily removed without failure typically by performing a heat treatment. The adhesive, if remained on the adherend after removal, can be easily dissolved and cleared from the adherend by washing with a solvent. The adhesive according to the present invention is therefore advantageously usable as an adhesive for temporarily securing a fragile adherend.

The invention claimed is:

1. An adhesive comprising:
   a multivalent vinyl ether compound (A) comprising at least one compound selected from the group consisting of
   a compound represented by Formula (a-1):

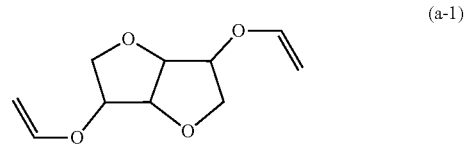

(a-1)

a compound represented by Formula (a-2):

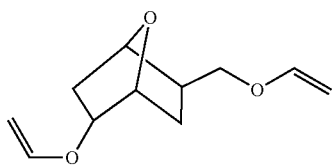

(a-2)

a compound represented by Formula (a-4):

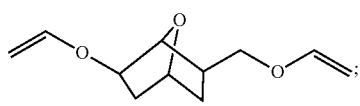

(a-4)

and
a compound represented by Formula (a-6):

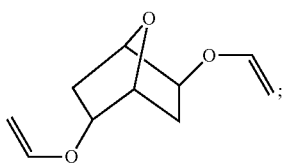

(a-6)

and
at least one of:
a compound (B) represented by Formula (b); and
a compound (C) including two or more constitutional units each represented by Formula (c), Formulae (b) and (c) expressed as follows:

$$Z_1\text{-}(X)_{n_1} \qquad (b)$$

wherein $Z_1$ represents a group corresponding to a compound selected from the group consisting of saturated or unsaturated aliphatic hydrocarbons, saturated or unsaturated alicyclic hydrocarbons, aromatic hydrocarbons, heterocyclic compounds, and compounds including two or more of them bonded to one another with or without medium of a linkage group, except for removing hydrogen atoms in a number of $n_1$ from a structural formula of the compound; X is selected from a hydroxyl group and a carboxyl group; and $n_1$ represents an integer of 2 or more, where $n_1$ occurrences of X may be identical to or different from each other,

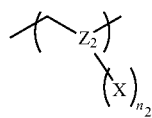

(c)

wherein $Z_2$ represents a group corresponding to a compound selected from the group consisting of saturated or unsaturated aliphatic hydrocarbons, saturated or unsaturated alicyclic hydrocarbons, aromatic hydrocarbons, heterocyclic compounds, and compounds including two or more of them bonded to one another with or without medium of a linkage group, except for removing hydrogen atoms in a number of $(n_2+2)$ from a structural formula of the compound; X is selected from a hydroxyl group and a carboxyl group; and $n_2$ represents an integer of 1 or more, where $n_2$ occurrence(s) of X may be identical to or different from each other.

2. The adhesive according to claim 1, further comprising an acid generator.

3. The adhesive according to claim 1,
wherein the compound (C) has a weight-average molecular weight of 1500 or more as determined by Gel Permeation Chromatography and calibrated with a polystyrene standard.

4. The adhesive according to claim 1,
wherein the adhesive comprises:
0.5% to 80% by weight of the multivalent vinyl ether compound (A); and
20% to 99.5% by weight in total of the at least one of the compound (B) and the compound (C),
based on the total amount of polymerizable compounds contained in the adhesive.

5. The adhesive according to claim 1, further comprising
at least one of:
a monovalent carboxylic acid represented by Formula (d); and
a monohydric alcohol represented by Formula (e), Formulae (d) and (e) expressed as follows:

$$Z_4\text{—COOH} \qquad (d)$$

wherein $Z_4$ represents a group corresponding to a compound selected from the group consisting of saturated or unsaturated aliphatic hydrocarbons, saturated or unsaturated alicyclic hydrocarbons, and aromatic hydrocarbons, each of which may have one or more substituents excluding carboxyl groups, except for removing one hydrogen atom from the structural formula of the corresponding compound, $$Z_5\text{—OH} \qquad (e)$$

wherein $Z_5$ represents a group corresponding to an aromatic hydrocarbon which may have one or more substituents excluding hydroxyl groups, except for removing one hydrogen atom from the structural formula of the aromatic hydrocarbon.

6. The adhesive according to claim 1, further comprising a surfactant.

* * * * *